United States Patent
Ellman et al.

(10) Patent No.: US 12,050,022 B2
(45) Date of Patent: Jul. 30, 2024

(54) LIQUID DESICCANT AIR CONDITIONING SYSTEM AND CONTROL METHODS

(71) Applicant: Mojave Energy Systems, Inc., Palo Alto, CA (US)

(72) Inventors: Rachel Ellman, Palo Alto, CA (US); J. R. Heberle, Palo Alto, CA (US); Aaron Meles, Palo Alto, CA (US); Philip Farese, Palo Alto, CA (US)

(73) Assignee: Mojave Energy Systems, Inc., Sunnyvale, CA (US)

( * ) Notice: Subject to any disclaimer, the term of this patent is extended or adjusted under 35 U.S.C. 154(b) by 0 days.

(21) Appl. No.: 18/402,365

(22) Filed: Jan. 2, 2024

(65) Prior Publication Data
US 2024/0210050 A1 Jun. 27, 2024

Related U.S. Application Data

(63) Continuation of application No. PCT/US2023/083438, filed on Dec. 11, 2023.

(60) Provisional application No. 63/387,017, filed on Dec. 12, 2022.

(51) Int. Cl.
*F24F 5/00* (2006.01)
*F24F 11/83* (2018.01)
(52) U.S. Cl.
CPC ............ *F24F 5/0014* (2013.01); *F24F 11/83* (2018.01)
(58) Field of Classification Search
CPC .................................. F24F 5/0014; F24F 11/83
See application file for complete search history.

(56) References Cited

U.S. PATENT DOCUMENTS

| | | |
|---|---|---|
| 2,147,248 A | 2/1939 | Fleisher |
| 2,214,880 A | 9/1940 | Crawford |
| 2,276,970 A | 3/1942 | Hyde |

(Continued)

FOREIGN PATENT DOCUMENTS

| | | |
|---|---|---|
| CN | 105308317 A | 2/2016 |
| CN | 206055832 U | 3/2017 |

(Continued)

OTHER PUBLICATIONS

International Search Report and Written Opinion for International Application No. PCT/US2023/083438 dated May 10, 2024, 12 pages.

(Continued)

*Primary Examiner* — Emmanuel E Duke
(74) *Attorney, Agent, or Firm* — COOLEY LLP

(57) ABSTRACT

Liquid desiccant air conditioning systems and methods to operate them to achieved desired supply air dry bulb temperature and humidity conditions are described herein. In some embodiments, the liquid desiccant air conditioning systems can include a cooling unit, an absorber, a regenerator, and a control unit. The control unit can be operably coupled to the cooling unit, the absorber, and the regenerator such that the control unit can operate the liquid desiccant system to produce a supply air stream at a relatively independent target temperature and humidity. In some embodiments, the control unit can adjust one or more parameters and/or variables of the components of the liquid desiccant system to produce the supply air stream at a high energy efficiency.

30 Claims, 10 Drawing Sheets

(56) References Cited

U.S. PATENT DOCUMENTS

| | | |
|---|---|---|
| 2,290,465 A | 7/1942 | Crawford |
| 2,672,024 A | 3/1954 | McGrath |
| 2,798,570 A | 7/1957 | Kelley |
| 3,277,954 A | 10/1966 | Gershon |
| 3,336,423 A | 8/1967 | Le et al. |
| 3,350,892 A | 11/1967 | Kelley |
| 3,729,142 A | 4/1973 | Rangel et al. |
| 3,819,118 A | 6/1974 | Brock et al. |
| 3,981,452 A | 9/1976 | Eckstein |
| 3,993,248 A | 11/1976 | Harmony |
| 4,118,299 A | 10/1978 | Maget |
| 4,164,125 A | 8/1979 | Griffiths |
| 4,205,529 A | 6/1980 | Ko |
| 4,259,849 A | 4/1981 | Griffiths |
| 4,287,721 A | 9/1981 | Robison |
| 4,340,479 A | 7/1982 | Pall |
| 4,340,480 A | 7/1982 | Pall et al. |
| 4,355,683 A | 10/1982 | Griffiths |
| 4,593,534 A | 6/1986 | Bloomfield |
| 4,612,019 A | 9/1986 | Langhorst |
| 4,691,530 A | 9/1987 | Meckler |
| 4,700,550 A | 10/1987 | Rhodes |
| 4,900,448 A | 2/1990 | Bonne et al. |
| 4,984,434 A | 1/1991 | Peterson et al. |
| 5,022,241 A | 6/1991 | Wilkinson |
| 5,058,394 A * | 10/1991 | Wilkinson ............ F24F 3/1417 62/271 |
| 5,070,703 A * | 12/1991 | Wilkinson ........... B01D 53/263 62/271 |
| 5,351,497 A | 10/1994 | Lowenstein |
| 5,460,004 A | 10/1995 | Tsimerman |
| 5,528,905 A | 6/1996 | Scarlatti |
| 5,586,727 A | 12/1996 | Shekalim |
| 5,615,838 A | 4/1997 | Eckstein et al. |
| 5,634,269 A | 6/1997 | Lowenstein et al. |
| 5,797,272 A | 8/1998 | James |
| 5,928,409 A | 7/1999 | Sirkar |
| 5,966,955 A | 10/1999 | Maeda |
| 6,018,954 A | 2/2000 | Assaf |
| 6,080,507 A | 6/2000 | Yu |
| 6,149,817 A | 11/2000 | Peterson et al. |
| 6,159,352 A | 12/2000 | Riera et al. |
| 6,187,201 B1 | 2/2001 | Abe et al. |
| 6,463,750 B2 | 10/2002 | Assaf |
| 6,487,872 B1 | 12/2002 | Forkosh et al. |
| 6,497,107 B2 | 12/2002 | Maisotsenko et al. |
| 6,497,749 B2 | 12/2002 | Kesten et al. |
| 6,719,891 B2 | 4/2004 | Ruhr et al. |
| 6,745,826 B2 | 6/2004 | Lowenstein et al. |
| 6,976,365 B2 | 12/2005 | Forkosh et al. |
| 6,986,428 B2 | 1/2006 | Hester et al. |
| 7,083,730 B2 | 8/2006 | Davis |
| 7,279,215 B2 | 10/2007 | Hester et al. |
| 7,430,878 B2 | 10/2008 | Assaf |
| 7,942,011 B2 | 5/2011 | Forkosh |
| 7,942,387 B2 | 5/2011 | Forkosh |
| 7,974,076 B2 | 7/2011 | Xiong et al. |
| 7,977,395 B2 | 7/2011 | Lin et al. |
| 7,992,855 B2 | 8/2011 | Awano |
| 8,142,633 B2 | 3/2012 | Batchelder et al. |
| 8,171,746 B2 | 5/2012 | Miyauchi et al. |
| 8,545,692 B2 | 10/2013 | James et al. |
| 8,623,210 B2 | 1/2014 | Manabe et al. |
| 8,685,142 B2 | 4/2014 | Claridge et al. |
| 8,696,805 B2 | 4/2014 | Chang et al. |
| 8,769,971 B2 | 7/2014 | Kozubal et al. |
| 8,769,972 B2 | 7/2014 | Bahar |
| 8,790,454 B2 | 7/2014 | Lee et al. |
| 8,800,308 B2 | 8/2014 | Vandermeulen et al. |
| 8,801,910 B2 | 8/2014 | Bazant et al. |
| 8,999,132 B2 | 4/2015 | Bazant et al. |
| 9,000,289 B2 | 4/2015 | Vandermeulen et al. |
| 9,086,223 B2 | 7/2015 | Vandermeulen et al. |
| 9,101,874 B2 | 8/2015 | Vandermeulen |
| 9,101,875 B2 | 8/2015 | Vandermeulen et al. |
| 9,112,217 B2 | 8/2015 | Kim et al. |
| 9,140,471 B2 | 9/2015 | Kozubal et al. |
| 9,243,810 B2 | 1/2016 | Vandermeulen et al. |
| 9,273,876 B2 | 3/2016 | Smith et al. |
| 9,308,490 B2 | 4/2016 | Vandermeulen et al. |
| 9,340,436 B2 | 5/2016 | Sahu et al. |
| 9,506,697 B2 | 11/2016 | Vandermeulen |
| 9,541,302 B2 | 1/2017 | Taylor et al. |
| 9,546,426 B2 | 1/2017 | Logan et al. |
| 9,548,620 B2 | 1/2017 | Hu et al. |
| 9,631,848 B2 | 4/2017 | Vandermeulen et al. |
| 9,640,826 B2 | 5/2017 | Yan et al. |
| 9,670,077 B2 | 6/2017 | Volkel et al. |
| 9,673,472 B2 | 6/2017 | Volkel et al. |
| 9,709,285 B2 | 7/2017 | Vandermeulen |
| 9,835,340 B2 | 12/2017 | Vandermeulen et al. |
| 9,905,876 B2 | 2/2018 | Schubert et al. |
| 9,982,901 B2 | 5/2018 | Mongar |
| 10,012,401 B2 | 7/2018 | Forkosh |
| 10,024,558 B2 | 7/2018 | Vandermeulen |
| 10,124,296 B2 | 11/2018 | Pozzo et al. |
| 10,302,317 B2 | 5/2019 | Erb et al. |
| 10,443,868 B2 | 10/2019 | Vandermeulen et al. |
| 10,525,417 B2 | 1/2020 | Newbloom et al. |
| 10,550,014 B2 | 2/2020 | Desai et al. |
| 10,604,426 B2 | 3/2020 | Connor, Jr. et al. |
| 10,648,743 B2 | 5/2020 | Kozubal et al. |
| 10,655,870 B2 | 5/2020 | Lowenstein |
| 10,712,024 B2 | 7/2020 | LePoudre et al. |
| 10,721,024 B2 | 7/2020 | Seo |
| 10,821,395 B2 | 11/2020 | Beh et al. |
| 10,822,254 B2 | 11/2020 | Desai et al. |
| 10,962,252 B2 | 3/2021 | LePoudre et al. |
| 11,015,875 B2 | 5/2021 | Benedict et al. |
| 11,020,713 B2 | 6/2021 | Demeter et al. |
| 11,029,045 B2 | 6/2021 | Woods et al. |
| 11,117,090 B2 | 9/2021 | Benedict et al. |
| 11,149,970 B2 | 10/2021 | Bahar et al. |
| 11,185,823 B2 | 11/2021 | Beh et al. |
| 11,326,790 B2 | 5/2022 | Woods et al. |
| 11,532,831 B1 | 12/2022 | Beh |
| 11,760,631 B2 | 9/2023 | Chandran et al. |
| 11,944,934 B2 | 4/2024 | Benedict et al. |
| 2002/0038552 A1 | 4/2002 | Maisotsenko et al. |
| 2003/0121271 A1 | 7/2003 | Dinnage et al. |
| 2004/0118125 A1 | 6/2004 | Potnis et al. |
| 2004/0168462 A1 | 9/2004 | Assaf |
| 2004/0231512 A1 | 11/2004 | Slayzak et al. |
| 2005/0183956 A1 | 8/2005 | Katefidis |
| 2006/0130654 A1 | 6/2006 | King et al. |
| 2006/0141346 A1 | 6/2006 | Gordon et al. |
| 2009/0114594 A1 | 5/2009 | Sirkar |
| 2009/0178436 A1 | 7/2009 | Chiriac |
| 2010/0170776 A1 | 7/2010 | Ehrenberg et al. |
| 2010/0275629 A1* | 11/2010 | Erickson ............... F24F 3/1417 62/304 |
| 2011/0132027 A1 | 6/2011 | Gommed et al. |
| 2012/0304862 A1 | 12/2012 | Taylor et al. |
| 2013/0199220 A1 | 8/2013 | Ma et al. |
| 2013/0319021 A1 | 12/2013 | Ball et al. |
| 2013/0340449 A1 | 12/2013 | Kozubal et al. |
| 2014/0054013 A1 | 2/2014 | LePoudre et al. |
| 2014/0260367 A1 | 9/2014 | Coutu et al. |
| 2014/0262125 A1 | 9/2014 | Erb et al. |
| 2014/0326433 A1 | 11/2014 | Kozubal |
| 2014/0349279 A1 | 11/2014 | Berthelot et al. |
| 2015/0048777 A1 | 2/2015 | Goldstein |
| 2015/0059576 A1 | 3/2015 | Shibata |
| 2015/0068225 A1 | 3/2015 | Laughman et al. |
| 2015/0101625 A1 | 4/2015 | Newton et al. |
| 2015/0232348 A1 | 8/2015 | Jepson |
| 2015/0260420 A1 | 9/2015 | Forkosh |
| 2015/0291452 A1 | 10/2015 | Jikihara et al. |
| 2015/0292754 A1 | 10/2015 | Mongar |
| 2015/0300754 A1 | 10/2015 | Vandermeulen et al. |
| 2015/0327596 A1 | 11/2015 | Alarcon et al. |
| 2016/0138817 A1 | 5/2016 | Hamlin et al. |
| 2017/0145803 A1 | 5/2017 | Yeh et al. |
| 2017/0292722 A1 | 10/2017 | Vandermeulen |

(56) References Cited

U.S. PATENT DOCUMENTS

| | | | |
|---|---|---|---|
| 2017/0370598 A1* | 12/2017 | Hamlin | F24F 3/147 |
| 2018/0187906 A1 | 7/2018 | Bahar et al. | |
| 2018/0191012 A1 | 7/2018 | Zhang et al. | |
| 2018/0328602 A1 | 11/2018 | Vandermeulen | |
| 2019/0145639 A1 | 5/2019 | Allen et al. | |
| 2019/0240614 A1 | 8/2019 | Beh et al. | |
| 2019/0240623 A1 | 8/2019 | Beh et al. | |
| 2019/0285290 A1 | 9/2019 | Woods et al. | |
| 2019/0331353 A1 | 10/2019 | Edström et al. | |
| 2020/0039314 A1 | 2/2020 | Minakuchi et al. | |
| 2020/0063995 A1 | 2/2020 | LePoudre | |
| 2020/0070094 A1 | 3/2020 | Hussaini et al. | |
| 2020/0096212 A1 | 3/2020 | LePoudre | |
| 2020/0164302 A1 | 5/2020 | Benedict et al. | |
| 2020/0164312 A1 | 5/2020 | Beh et al. | |
| 2020/0173671 A1* | 6/2020 | Rowe | F24F 3/06 |
| 2020/0182493 A1 | 6/2020 | Luttik | |
| 2020/0278126 A1 | 9/2020 | Ide et al. | |
| 2020/0326106 A1 | 10/2020 | Muthusubramanian | |
| 2020/0333086 A1 | 10/2020 | Benedict et al. | |
| 2020/0346164 A1 | 11/2020 | Verplancke | |
| 2020/0384421 A1 | 12/2020 | Newbloom et al. | |
| 2020/0388871 A1 | 12/2020 | Newbloom et al. | |
| 2020/0393145 A1 | 12/2020 | Woods et al. | |
| 2021/0254844 A1 | 8/2021 | Qasem et al. | |
| 2021/0283528 A1 | 9/2021 | Pokornýet al. | |
| 2021/0298246 A1 | 9/2021 | Lefers et al. | |
| 2021/0354089 A1 | 11/2021 | Wu et al. | |
| 2021/0370228 A1 | 12/2021 | Benedict et al. | |
| 2022/0193612 A1 | 6/2022 | Torres et al. | |
| 2022/0223885 A1 | 7/2022 | Beh et al. | |
| 2022/0243932 A1 | 8/2022 | Benedict et al. | |
| 2022/0299223 A1 | 9/2022 | Benedict et al. | |
| 2022/0410070 A1 | 12/2022 | Beh | |
| 2023/0141446 A1 | 5/2023 | Beh et al. | |
| 2023/0173433 A1 | 6/2023 | Benedict et al. | |
| 2023/0191312 A1 | 6/2023 | Benedict et al. | |
| 2023/0264140 A1 | 8/2023 | Beh et al. | |
| 2023/0280049 A1 | 9/2023 | Farese et al. | |
| 2023/0294038 A1 | 9/2023 | Wallace | |
| 2023/0332780 A1 | 10/2023 | Meles et al. | |
| 2024/0131468 A1 | 4/2024 | Morajkar | |

FOREIGN PATENT DOCUMENTS

| | | |
|---|---|---|
| CN | 108187459 A | 6/2018 |
| CN | 207455783 U | 6/2018 |
| CN | 111964168 A | 11/2020 |
| EP | 3060856 A1 | 8/2016 |
| EP | 3336064 A1 | 6/2018 |
| EP | 4063001 A1 | 9/2022 |
| JP | H0418919 A | 1/1992 |
| KR | 20130106530 A | 9/2013 |
| KR | 20150034545 A | 4/2015 |
| WO | WO-9528609 A1 | 10/1995 |
| WO | WO-2011062808 A1 | 5/2011 |
| WO | WO-2012170887 A2 | 12/2012 |
| WO | WO-2014181898 A1 | 11/2014 |
| WO | WO-2015143332 A2 | 9/2015 |
| WO | WO-2018032003 A1 | 2/2018 |
| WO | WO-2018119280 A1 | 6/2018 |
| WO | WO-2018191806 A1 | 10/2018 |
| WO | WO-2019089971 A1 | 5/2019 |
| WO | WO-2020112592 A1 | 6/2020 |
| WO | WO-2020112712 A1 | 6/2020 |
| WO | WO-2023122749 A2 | 6/2023 |
| WO | WO-2023201184 A1 | 10/2023 |
| WO | WO-2024086450 A1 | 4/2024 |

OTHER PUBLICATIONS

Kalpana et al., "Developments in liquid dessicant dehumidifcation system integrated with evaporative cooling technology," International Journal of Energy Research, vol. 46, No. 1, Apr. 2, 2021, pp. 61-88.

Abdollahi and Shams, "Optimization of shape and angle of attack of winglet vortex generator in a rectangular channel for heat transfer enhancement," Applied Thermal Engineering, 2015; 81:376-387.

Al-Jubainawi et al., "Factors governing mass transfer during membrane electrodialysis regeneration of LiCl solution for liquid desiccant dehumidification systems", Sustainable Cities and Society, (Aug. 26, 2016); 28:30-41.

Al-Karaghouli et al., "Energy consumption and water production cost of conventional and renewable-energy-powered desalination processes", Renewable and Sustainable Energy Reviews 2013, 24, 343-356.

Anderson et al., "Capacitive deionization as an electrochemical means of saving energy and delivering clean water. Comparison to present desalination practices: Will it compete?", Electrochimica Acta 2010, 55 (12), 3845-3856.

Arellano et al., "Effects of pH on the degradation of aqueous ferricyanide by photolysis and photocatalysis under Solar radiation", Solar Energy Materials and Solar Cells 2010, 94 (2), 327-332.

Ashrae, et al., "Desiccant Dehumidification and Pressure Drying Equipment," 2012 ASHRAE Handbook—HVAC Systems and Equipment, Chapter 24, pp. 24.1-24.12.

Ashrae Standard, "Method of Testing for Rating Desiccant Dehumidifiers Utilizing Heat for the Regeneration Process", (2007); 4 pages.

Bajpayee et al., "Very low temperature membrane-free desalination by directional solvent extraction", Energy Environ. Sci. 2011,4 (5), 1672.

Beh et al., "A Neutral pH Aqueous Organic-Organometallic Redox Flow Battery with Extremely High Capacity Retention" ACS Energy Lett, 2017, vol. 2, pp. 639-644.

Biswas and Chattopadhyay, Heat Transfer in a Channel with Built-In Wing-Type Vortex Generators, Int J Heat Mass Transfer, 1992; 35(4):803-814.

Biswas et al., "Numerical and experimental determination of flow structure and heat transfer effects of longitudinal vortices in a channel flow," Int J Heat Mass Transfer, 1996; 39(16):3441-3451.

Btmap-Vi et al., "Ordering and Customer Service Neutral pH Aqueous Redox Flow Battery Materials", Jan. 1, 2017, p. 639.

Chen et al., "Experimental and numerical heat transfer investigation of an impingement jet array with V-ribs on the target plate and on the impingement plate," Intl J Heat Fluid Flow, 2017;68:126-138.

Cheng et al., "Double-Stage Photovoltaic/Thermal ED Regeneration for Liquid Desiccant Cooling System", Energy and Buildings, 51,2012, pp. 64-72.

Cheng et al., "Experimental investigation of an electrodialysis regenerator for liquid desiccant", Energy and Buildings, (2013); 67:419-425.

Cheng et al., "Performance analysis of a new desiccant pre-treatment electrodialysis regeneration system for liquid desiccant", 2013, Elsevier, 66, 1-15 (Year: 2013).

Conde-Petit and Weber, "Open Absorption System for Cooling and Air Conditioning using Membrane Contactors—Annual Report 2006," Publication No. 260098, Project: 101310—Open Absorption System for Cooling and Air Conditioning using Membrane Contactors, Date of publication: Nov. 14, 2006, Contractor: M. Conde Engineering, 13 pages.

Conde-Petit and Weber, "Open Absorption System for Cooling and Air Conditioning Using Membrane Contactors—Final Report," Publication No. 280139, Project: 101310—Open Absorption System for Cooling and Air conditioning using Membrane Contactors, Date of publication: Jul. 8, 2008, Contractor: M. Conde Engineering. 50 pages.

Conde-Petit, M. "Liquid Desiccant-Based Air-Conditioning Systems—LDACS," Proc. of the 1st European Conference on Polygeneration—Technologies and Applications, 217-234, A. Coronas, ed., Tarragona—Spain, Oct. 16-17, 2007 Published by Crever-Universitat, 17 pages.

Conde-Petit, M. Open Absorption Systems for Air-Conditioning using Membrane Contactors, Proceedings '15. Schweizerisches Status-Seminar Energie-und Umweltforschung im Bauwesen, Sep.

(56) References Cited

OTHER PUBLICATIONS 11-12, 2008—ETH Zurich, Switzerland. Published by Brenet-Eggwilstr. 16a, CH-9552 Bronschhofen-Switzerland (brenet@vogel-tech.ch), 12 pages.
Conde-Petit, Manuel, "Open Absorption System for Cooling and Air Conditioning using Membrane Contactors—Annual Report 2005," Publication No. Publication 260097, Project: 101310-Open Absorption System for Cooling and Air conditioning using Membrane Contactors, Date of publication: Jan. 31, 2006, Contractor: M. Conde Engineering, 8 pages.
"Cooling tower Fill material: Gain a Deep Understanding," Linquip Technews, available online [retrieved on Mar. 1, 022]. Retrieved from the internet: URL: https://www.linquip.com/blog/cooling-tower-fill-materiala/; 3 pgs.
Dai, "Increasing drought under global warming in observations and models", Nat. Clim. Change 2013, 3(1):52-58.
Darling et al., "Pathways to low-cost electrochemical energy storage: a comparison of aqueous and nonaqueous flow batteries", Energy Environ. Sci. 2014, 7 (11), 3459-3477.
Dean and Lowenstein, "A Solar Liquid-Desiccant Air Conditioner for Low-electricity Humidity Control—Summary Report," Energy and Water Projects Demonstration Plan SI-0822; TP-7 M0-56437-2, Nov. 2012; 41 pgs.
Desai et al., "Electrochemical Desalination of Seawater and Hypersaline Brines with Coupled Electricity Storage", ACS Energy Lett. 3, 2, 2018, pp. 375-379.
Desalination Experts Group, "Desalination in the GCC", 2014,47 pages.
Dipaola, "Saudi Arabia Gets Cheapest Bids for Solar Power in Auction" Bloomberg, Jan. 16, 2018, 3 pages.
Ebrahimi et al., "Numerical study of liquid flow and heat transfer in rectangular microchannel with longitudinal vortex generators," Applied Thermal Eng, 2015; 78:576-583.
Epsztein et al., "Activation behavior for ion permeation in ion-exchange membranes: Role of ion dehydration in selective transport", Journal of Membrane Science 580, 2019, pp. 316-326.
European Search Report for EP22151282.5 issued by the European Patent Office, Jun. 3, 2022; 10 pgs.
Extended European Search Report for EP 22150661.1 issued by the European Patent Office on Jun. 9, 2022; 14 pgs.
Extended European Search Report for European Application No. 22157879.4, dated Aug. 26, 2022, 10 pages.
Ferguson et al., "Studies on Overvoltage. IX: The Nature of Cathode and Anode Discharge Potentials at Several Metal Surfaces1,2", J. Phys. Chem. (1937); 42(2):171-190.
Friedman et al. "Mapping Microscale Chemical Heterogeneity in Nation Membranes with X-ray Photoelectron Spectroscopy," Journal of the Electrochemical Society, (2018); 165(11):733-741.
Gao et al., "A review on integration and design of desiccant air-conditioning systems for overall performance improvements," Renewable and Sustainable Energy Reviews, Feb. 23, 2021;141:110809: 25 pgs.
Gentry and Jacobi, "Heat Transfer Enhancement on a Flat Plate using Delta-Wing Vortex Generators," ACRC Project 40, Jul. 1995:109 pgs.
Gong et al., "A zinc-iron redox-flow battery under $100 per kWh of system capital cost", Energy & Environmental Science, 2015. 5 pages.
Gong et al., All-Soluble All-Iron Aqueous Redox-Flow Battery, ACS Energy Letters, 2016, 1, pp. 89-93.
Google Search for "liquid desiccant air conditioning electrodialysis" dated Mar. 9, 2021, 2 pages.
Gowin, "Examining the economics of seawater desalination using the DEEP code", Nuclear Power Technology Development Section, I. A. E. A., Ed. Vienna, Austria, (2000); 88 pages.
Gu et al., "A multiple ion-exchange membrane design for redox flow batteries", Energy Environ. Sci. 2014, 7 (9), pp. 2986-2998.
Guler et al. "Performance-determining membrane properties in reverse electrodialysis", Journal of Membrane Science, (2013); 446:266-276.
Guo, Y., et al., "Using electrodialysis for regeneration of aqueous lithium chloride solution in liquid desiccant air conditioning systems," Energy and Buildings, 2016, 116, pp. 285-295.
Hilbert et al., "Correlations between the Kinetics of Electrolytic Dissolution and Deposition of Iron: I . The Anodic Dissolution of Iron", Journal of The Electrochemical Society 1971, 118(12):1919-1926.
Howell et al., "Overview of the DOE VTO Advanced Battery R&D Program", (Jun. 6, 2016); 24 pages.
Hu et al, "Long-Cycling Aqueous Organic Redox Flow Battery (AORFB) toward Sustainable and Safe Energy Storage", Journal of the American Chemical Society 2017, 139 (3), 1207-1214.
John et al., "Seasonal cycles of temperature, salinity and water masses of the western Arabian gulf", Oceanol. Acta 1990, 13 (3), 273-281.
Kaibara et al., "Study of Ion Transport across Amphoteric Ion Exchange Membrane. II. Transport of Symmetric Tetraalkylammonium Chlorides", Bull. Chem. Sco. Jpn, 56, 1983, pp. 1346-1350.
Khawaji et al., "Advances in seawater desalination technologies", Desalination 2008, 221 (1-3), 47-69.
Konopka et al., "Diffusion coefficients of ferri- and ferrocyanide ions in aqueous media, using twin-electrode thin-layer electrochemistry", Anal. Chem. (1970); 42(14):1741-1746.
Kozubal et al., "Low-Flow Liquid Desiccant Air-Conditioning: Demonstrated Performance and Cost Implications" NREL Technical Report, Sep. 2014, 104 pages.
La Mantia et al., "Batteries for efficient energy extraction from a water salinity difference", Nano Lett. 2011, 11 (4), 1810-3.
"Lazard's Levelized Cost of Storage—Version 2.0." 2016, 46 pages.
Lee et al., "Desalination of a thermal power plant wastewater by membrane capacitive deionization", Desalination 196, 2006, pp. 125-134.
Lee et al., "Rocking chair desalination battery based on Prussian blue electrodes", ACS Omega 2017, 2 (4), 1653-1659.
Li et al., "Numerical simulation on flow and heat transfer of fin-and-tube heat exchanger with longitudinal vortex generators," Intl J Thermal Sci; 2015; 92:85-96.
Li et al., "Photovoltaic-electrodialysis regeneration method for liquid desiccant cooling system", Solar Energy, vol. 83, 2009, pp. 2195-2204.
Li, F., et al., "Novel spacers for mass transfer enhancement in membrane separations," Journal of Membrane Science, May 2005; 253(1-2): 1-12.
Ling, Y., et al., "CFD simulation of fluid flow through spacer-filled membrane module: selecting suitable cell types for periodic boundary conditions," Desalination, 2008; 233(1):351-358.
Logan et al, "Membrane-based processes for sustainable power generation using water", Nature 2012, 488, 313.
Loutatidou, et al., "Capital cost estimation of RO plants: GCC countries versus southern Europe", Desalination 2014, 347, 103-111.
Lu et al., "Numerical simulation on performances of plane and curved winglet—Pair vortex generators in a rectangular channel and field synergy analysis," Intl J Thermal Sci, 2016;109:323-333.
Malhotra et al., "Use cases for stationary battery technologies: A review of the literature and existing projects", Renewable and Sustainable Energy Reviews 56, 2016, pp. 705-721.
Mathsisfun "Polygons" 7 pages, 2020, https://www.mathsisfun.com/geometry/polygons.html#:~:text=Polygons%20are%202-dimensional%20shapes.%20They%20are%20made%20of,Greek.%20Poly-%20means%20%22many%22%20and%20-gon%20means%20%22angle%22, 7 pages (Year: 2020).
MGovern et al., "On the cost of electrodialysis for the desalination of high salinity feeds", Applied Energy 136, Dec. 2014, pp. 649-661.
Moore et al., "Evaporation from Brine Solutions Under Controlled Laboratory Conditions; Report 77 for the Texas Water Development Board", May 1968, 77 pages.
Nair et al., "Water desalination and challenges: The Middle East perspective: a review", Desalin. Water Treat. 2013, 51 (10-12), 2030-2040.

(56) References Cited

OTHER PUBLICATIONS

Oren, "Capacitive deionization (CDI) for desalination and water treatment—past, present and future (a review)", Desalination 2008, 228 (1-3), 10-29.
Pasta et al., "A desalination battery" Nano Lett.2012, 12 (2), 839-43.
Patankar and Prakash, "An Analysis of the Effect of Plate Thickness on Laminar Flow and Heat Transfer in Interrupted-Plate Passages," Intl J Heat Mass Transfer, 1981; 24(11):1801-1810.
Patil et al., "Diffusivity of some zinc and cobalt salts in water", J. Chem. Eng. Data 1993, 38 (4), 574-576.
Petrova et al., "Perfluorinated hybrid membranes modified by metal decorated clay nanotubes", Journal of Membrane Science, vol. 582, Jul. 15, 2019, pp. 172-181.
Pismenskaya et al., "Can the electrochemical performance of heterogeneous ion-exchange membranes be better than that of homogeneous membranes?", Journal of Membrane Science, vol. 566, Nov. 15, 2018, pp. 54-68.
Sadrzadeh et al., "Sea water desalination using electrodialysis", Desalination 2008, 221 (1), 440-447.
Schaetzle et al., "Salinity Gradient Energy: Current State and New Trends", Engineering, vol. 1, Issue 2, Jun. 2016, pp. 164-166.
Scialdone et al., "Investigation of electrode material—Redox couple systems for reverse electrodialysis processes. Part 1: Iron redox couples", Journal of Electroanalytical Chemistry 2012, 681 (Supplement C), 66-75.
Scialdone et al., "Investigation of electrode material—redox couple systems for reverse electrodialysis processes—Part II: Experiments in a stack with 10-50 cell pairs", Journal of Electroanalytical Chemistry, vol. 704, Jun. 14, 2013, pp. 1-9.
Seto et al., "Seawater desalination by electrodialysis," Desalination, (1978); 25(1):1-7.
Shah et al., "Comparative Studies on Performance of Interpolymer and Heterogeneous ion-Exchange Membranes for Water Desalination by Electrodialysis", Desalination 172, 2005, pp. 257-265.
Shamshery et al., "Modeling the future of irrigation: A parametric description of pressure compensating drip irrigation miller performance," PLoS One, 2017; 12(4): e0175241: 24 pgs.
Solveichik, "Flow batteries: current status and trends", Chem. Rev. (2015); 115(20):11533-11558.
Song et al., "Interaction of counter rotating longitudinal vortices and the effect on fluid flow and heat transfer," Intl J Heat Mass Transfer, 2016; 93:349-360.
Stillwell et al., "Predicting the specific energy consumption of reverse osmosis desalination", Water 2016, 8 (12), 18 pages.
Tiggelbeck et al., "Experimental investigations of heat transfer enhancement and flow losses in a channel with double rows of longitudinal vortex generators," Intl J Heat Mass Transfer, 1993; 36(9):2327-2337.

"Two Stage Regenerator," AIL Research, Inc., available online [retrieved on Mar. 1, 2022]. Retrieved from the Internet: URL: http://ailr.com/our-technology/two-stage-regenerator/; 1 pg.
Urban, "Emerging Scientific and Engineering Opportunities within the Water-Energy Nexus", Joule, Dec. 20, 2017, pp. 665-688.
US Dept. of Energy, "Desiccant Enhanced Evaporative Air-Conditioning (DEVap): Evaluation of a New Concept in Ultra Efficient Air Conditioning," Technical Report NREL/TP-5500-49722, (2011), 71 pages.
US Dept. of Energy, "Energy Savings Potential and RD&D Opportunities for Commercial Building HVAC Systems", Dec. 2017, 172 pages.
US Dept. of Interior/US Geological Survey, "Estimated Use of Water in the United States in 2010," 2014, 64 pages.
Vermaas et al., "High Efficiency in Energy Generation from Salinity Gradients with Reverse Electrodialysis", ACS Sustainable Chem. Eng. 1, 2013, pp. 1295-1302.
Viswanathan et al., Cost and performance model for redox flow batteries, Journal of Power Sources, (2012); 247:1040-1051.
Vitillo et al., "Flow analysis of an innovative compact heat exchanger channel geometry," Intl J Heat Fluid Flow, 2016; 58:30-39.
Wang et al., "Continuous desalination with a metal-free redox-mediator", Journal of Materials Chemistry A, No. 7, 2019, 7 pages.
Woods, "Membrane processes for heating, ventilation, and air conditioning", Renewable and Sustainable Energy Reviews, vol. 33, 2014, pp. 290-304.
Wu and Tao, "Effect of longitudinal vortex generator on heat transfer in rectangular channels," Applied Thermal Engineering; 2012; 37:67-72.
Wu and Tao, "Numerical Study on laminar convection heat transfer in a channel with longitudinal vortex generator. Part B: Parametric study of major influence factors," Intl J Heat Mass Transfer, 2008; 51:3683-3692.
Wu et al., "Kinetic study on regeneration of Fe(II)EDTA in the wet process of NO removal", Chemical Engineering Journal 2008, 140 (1), 130-135.
Ye et al., "Performance of a mixing entropy battery alternately flushed with wastewater effluent and seawater for recovery of salinity gradient energy", Energy Environ. Sci. 2014, 7 (7), 2295-2300.
Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.
Zhang et al., "Performance optimization of heat pump driven liquid desiccant dehumidification systems," Energy and Buildings, Jun. 9, 2012;52:132-144.
Zhang et al., "The mechanism of heat transfer enhancement using longitudinal vortex generators in a laminar channel flow with uniform wall temperature," Intl J Thermal Sci, 2017; 17:26-43.

* cited by examiner

600

┌─────────────────────────────────────────────────────────────┐
│ Receive at a control unit operably coupled to a cooling unit, an absorber, and a desorber of a liquid desiccant, a signal from a sensor disposed downstream of the absorber, the signal indicative of an air supply temperature and an air supply humidity measured by the sensor. │
│ 601 │
└─────────────────────────────────────────────────────────────┘
                              ↓
┌─────────────────────────────────────────────────────────────┐
│ Determine, with a control unit, a humidity difference between the measured air supply dew point and a target air supply dew point. │
│ 602 │
└─────────────────────────────────────────────────────────────┘
                              ↓
┌─────────────────────────────────────────────────────────────┐
│ Determine, with a control unit, a dry bulb temperature difference between the measured air supply dry bulb temperature and a target air supply dry bulb temperature. │
│ 603 │
└─────────────────────────────────────────────────────────────┘
                              ↓
┌─────────────────────────────────────────────────────────────┐
│ Adjust, relatively quickly, via the control unit and based on the humidity difference, an enthalpy change of the supply air in the cooling unit such that the liquid desiccant system produces the air supply at the target humidity. │
│ 604 │
└─────────────────────────────────────────────────────────────┘
                              ↓
┌─────────────────────────────────────────────────────────────┐
│ Adjust, relatively slowly, via the control unit and based on the dry bulb temperature difference, at least one of an amount of heat or a quality of the heat entering the desorber such that the liquid desiccant system produces the air supply at the target dry bulb temperature. │
│ 605 │
└─────────────────────────────────────────────────────────────┘
                              ↓
┌─────────────────────────────────────────────────────────────┐
│ Further adjust, relatively slowly, via the control unit and based on the humidity difference, an enthalpy change of the supply air in the cooling unit such that the liquid desiccant system produces the air supply at the target humidity as the system adjusts the air supply to the target dry bulb temperature. │
│ 606 │
└─────────────────────────────────────────────────────────────┘

```
┌─────────────────────────────────────────────────────────────────────┐
│ Receive at a control unit operably coupled to a cooling unit, an    │
│ absorber, and a desorber of a liquid desiccant, a signal from a     │
│ sensor disposed downstream of the absorber, the signal indicative   │
│ of an air supply temperature and an air supply humidity measured    │
│ by the sensor.                                                      │
│                               701                                   │
└─────────────────────────────────────────────────────────────────────┘
                                  │
                                  ▼
┌─────────────────────────────────────────────────────────────────────┐
│ Determine, with a control unit, a humidity difference between the   │
│ measured air supply dew point and a target air supply dew point.    │
│                               702                                   │
└─────────────────────────────────────────────────────────────────────┘
                                  │
                                  ▼
┌─────────────────────────────────────────────────────────────────────┐
│ Determine, with a control unit, a dry bulb temperature difference   │
│ between the measured air supply dry bulb temperature and a target   │
│ air supply dry bulb temperature.                                    │
│                               703                                   │
└─────────────────────────────────────────────────────────────────────┘
                                  │
                                  ▼
┌─────────────────────────────────────────────────────────────────────┐
│ Adjust, relatively quickly, via the control unit and based on the   │
│ dry bulb temperature difference, an enthalpy change of the supply   │
│ air in the cooling unit such that the liquid desiccant system       │
│ produces the air supply at the target dry bulb temperature.         │
│                               704                                   │
└─────────────────────────────────────────────────────────────────────┘
                                  │
                                  ▼
┌─────────────────────────────────────────────────────────────────────┐
│ Adjust, relatively slowly, via the control unit and based on the    │
│ humidity difference, at least one of an amount of heat or a quality │
│ of the heat entering the desorber such that the liquid desiccant    │
│ system produces the air supply at the target humidity.              │
│                               705                                   │
└─────────────────────────────────────────────────────────────────────┘
                                  │
                                  ▼
┌─────────────────────────────────────────────────────────────────────┐
│ Further adjust, relatively slowly, via the control unit and based   │
│ on the temperature difference, an enthalpy change of the supply air │
│ in the cooling unit such that the liquid desiccant system produces  │
│ the air supply at the target dry bulb temperature as the system     │
│ adjusts the air supply to the target humidity.                      │
│                               706                                   │
└─────────────────────────────────────────────────────────────────────┘
```

FIG. 7

LIQUID DESICCANT AIR CONDITIONING SYSTEM AND CONTROL METHODS

CROSS-REFERENCE TO RELATED APPLICATIONS

This application is a continuation of International Application No. PCT/US23/83438, filed Dec. 11, 2023, which claims priority to and the benefit of U.S. Provisional Patent Application No. 63/387,017, entitled "Liquid Desiccant Air Conditioning System and Control Methods," filed Dec. 12, 2022, the disclosure of each of which is incorporated by reference herein in its entirety.

TECHNICAL FIELD

The present disclosure relates generally to air dehumidifying systems that utilize liquid desiccant and control methods for the same.

SUMMARY

The present disclosure describes a highly efficient liquid desiccant air conditioning system that utilizes two moisture removal devices in the cooled air stream, the first being a heat sink that simultaneously cools the air and condenses water out of it, and the second being an absorber unit that dehumidifies the air using a liquid desiccant. A control system adjusts the heat removed from the air stream in response to sensor sensed data of the inlet air stream entering the liquid desiccant system or the supply air stream exiting the liquid desiccant system. Dynamic adjustments by the control system allow relatively independent control of delivered air temperature and humidity, and minimizes overall energy consumption of the liquid desiccant system.

The present disclosure also describes a method of controlling a liquid desiccant air conditioning system including, circulating liquid desiccant at a liquid desiccant flow rate between an absorber unit and desorber unit, cooling an inlet air stream flowing through the liquid desiccant air conditioning system to form a precooled inlet air stream having a precooled temperature value and a precooled humidity value, regeneration air temperature and flow rate, vapor compression, and others, as described in further detail below. Depending on the temperature and humidity of the inlet air and of the precooled inlet air, moisture may be removed from the air stream by condensation, producing a first moisture removal rate. The cooled inlet air is then passed through the absorber unit. The liquid desiccant contacts the precooled inlet air stream and removes water from the precooled inlet air stream to form a supply air stream having a supply air absolute humidity value that is less than the precooled absolute humidity value, producing a second moisture removal rate, and forming a loaded liquid desiccant. The method also includes heating a regeneration air stream flowing through the liquid desiccant air conditioning system, and flowing the loaded liquid desiccant through the desorber unit, where the liquid desiccant contacts the heated regeneration air stream, and the heated regeneration air stream removes water from the loaded liquid desiccant to form a regenerated liquid desiccant and a humidified exhaust air stream. An embodiment of the method includes energizing a heat pump to cool the cooled inlet air stream to the cooled temperature value and heat the heated inlet air stream to the heated temperature value. The embodiment includes adjusting a heat pump heat flow rate value to achieve a predetermined supply air humidity value and temperature by manipulating the precooled air temperature value, the first moisture removal rate, and the second moisture removal rate, with the first moisture removal rate being primarily controlled by the precooled inlet air temperature setpoint, the second moisture removal rate being primarily controlled by the liquid desiccant concentration, which is itself determined by the heated temperature value and heated humidity value.

The present disclosure also describes a liquid desiccant air conditioning system including, a liquid desiccant loop having an absorber unit in fluid communication with a desorber unit and liquid desiccant flowing between the absorber unit and the desorber unit. The system includes a supply airflow path passing through the absorber unit and forming an absorber liquid/air and/or liquid/gas interface within the absorber unit and a conditioned supply airflow exiting the absorber unit. A sensor is configured to measure a conditioned supply airflow temperature and humidity value. A regeneration airflow path passes through the desorber unit and forms a desorber liquid/air interface within the desorber unit and an exhaust airflow exiting the desorber unit. In some embodiments, a heat pump is thermally coupled to the supply airflow path and removing heat and moisture via condensation from supply airflow upstream of the absorber unit. The heat pump is thermally coupled to the regeneration airflow path adding heat to regeneration airflow upstream of the desorber unit. The heat pump has a power unit providing power to the heat pump to cool the supply airflow and heat the regeneration airflow. A controller is operably connected to the sensor and the power unit. In some embodiments the controller is configured to adjust the operation of the power unit based on the system parameters including the evaporator leaving air temperature, the condenser leaving air temperature, the temperature of the refrigerant after condensing, the temperature of the refrigerant at the evaporator, and/or the configuration of various valves, to achieve the desired supply air temperature and humidity.

BRIEF DESCRIPTION OF THE DRAWINGS

The discussion below makes reference to the following figures, wherein the same reference number may be used to identify the similar/same component in multiple figures. The figures are not necessarily to scale.

FIG. 6 shows a method for conditioning a supply air stream with a liquid desiccant system, that prioritizes supply air dew point relative to supply air dry bulb temperature, according to an embodiment FIG. 7 shows a method for conditioning a supply air stream with a liquid desiccant system, that prioritizes supply dry bulb temperature relative to supply air dew point, according to an embodiment.

DETAILED DESCRIPTION

Figure 1:
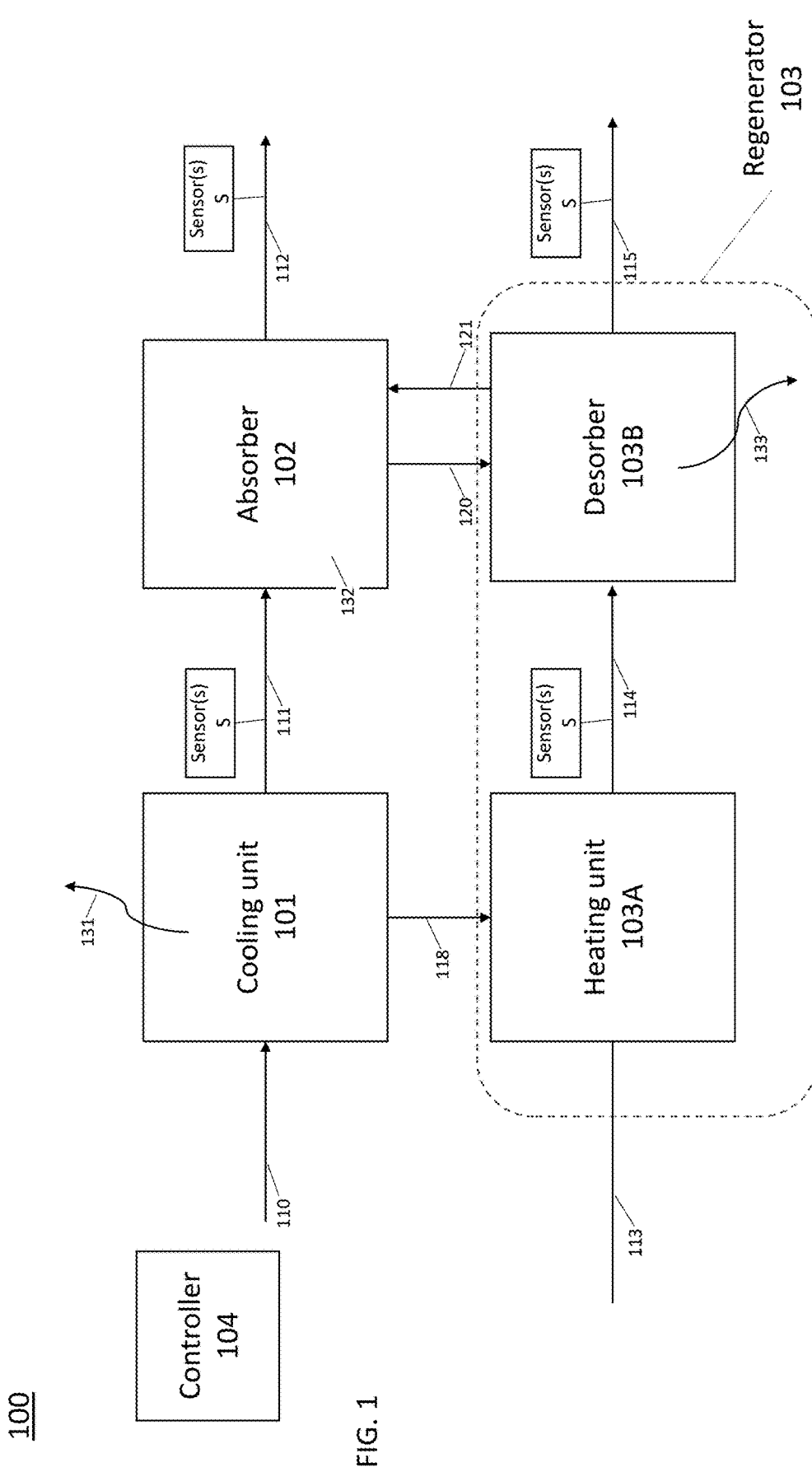
FIG. 1 is a schematic diagram of an illustrative liquid desiccant system, according to an embodiment.

The present disclosure is generally related to heating, ventilation, and air-conditioning (HVAC) systems and control methods for the same. In one example embodiment, a gas-to-liquid vapor exchanger includes an absorber unit to extract moisture from air into a liquid desiccant and a desorber unit to regenerate a liquid desiccant passing through both units. These units can be used to absorb and desorb water vapor into and out of the liquid desiccant to dehumidify or humidify air. This humidification and dehumidification can be used in HVAC heating and cooling applications. Unit operation control of the liquid desiccant system minimizes energy consumption.

Air conditioning systems may simultaneously perform two functions: first to dehumidify and second to cool a forced air stream. Commonly used air conditioning systems use vapor compression, which can both cool the incoming air and dehumidify it by cooling it below the dew point temperature of the air, thus condensing water. However, given a humid air stream, vapor compression may rely on cooling the air stream to below its desired delivery temperature to condense the moisture and achieve a low absolute humidity, then re-heating the air to its desired delivery temperature. This moisture condensation process dramatically increases the energy requirement of air conditioners, especially in humid climates. An alternative dehumidification method, known as liquid desiccant dehumidification, can substantially decrease the energy intensity of air conditioning, and is the subject of the present disclosure.

Removing moisture from air using a liquid desiccant is an energy-efficient alternative to vapor compression, since it minimizes or removes the need for excessive cooling and reheating of the air stream, as well as improving the coefficient of performance of an integrated heat pump by raising the low temperature required from the heat pump, which reduces heat pump energy consumption. In a liquid desiccant dehumidification system, the humid air exchanges water vapor with the liquid desiccant. A gas-to-liquid vapor exchanger (absorber unit) may be used to contact humid air and a liquid desiccant and transfer water vapor in the humid air into the liquid desiccant to form a loaded liquid desiccant. This loaded liquid desiccant may be regenerated in a gas-to-liquid vapor exchanger (desorber unit) by heating the loaded liquid desiccant to evaporate and/or drive off water vapor and return the regenerated liquid desiccant to the absorber unit. Alternatively, a loaded liquid desiccant may be regenerated by an electrochemical process (such as electrodialysis) or other process that separates the desiccant into a more dilute and a more concentrated portion of desiccant. The rate of regeneration of the desiccant in the desorber, specifically relative to the rate of collection of moisture in the absorber, will change the concentration of the desiccant. The liquid desiccant's potential for humidity absorption is governed by its concentration, with absorption potential increasing with higher concentration. Operating at higher concentrations enables a higher moisture removal rate from the air stream, however, higher concentrations require higher temperatures to regenerate. Increasing the temperature required from the heat pump to regenerate the desiccant reduces the coefficient of performance of the heat pump, resulting in higher heat pump energy consumption.

An advanced liquid desiccant system pre-cools (removes heat from) inlet air entering the absorber unit and pre-heats (adds heat to) inlet air entering the desorber unit. A heat pump may be used to move the heat from one unit to the other unit to reduce energy consumption of the overall liquid desiccant system. The liquid desiccant system and control method described herein may maximize an energy efficiency of the overall liquid desiccant system at a selected set of system air flow inlet parameters and desired outlet parameters. More specifically, for example, evaporator temperature, condenser temperature, and desiccant concentration can be accounted for and selectively manipulated to minimize or optimize energy use for various combinations of air inlet and outlet conditions.

Liquid desiccant air conditioning systems and methods described herein utilize two moisture removal devices in the supply air stream. The first moisture removal device is a heat sink that cools the air (also referred to herein as the cooling unit) and may remove moisture from the air by cooling the air below its saturation point and condensing water. A control system can adjust the temperature of the cooling unit, and thus the precooled air temperature and dew point, as well as a rate of moisture removal and/or condensation (if any) by that unit. The second moisture removal device is the liquid desiccant absorber, which uses the liquid desiccant to transfer water vapor from the cooled air to the desiccant. A control system can adjust the amount and/or quality of heat transferred into the desiccant in the regenerator thus changing the rate of regeneration and the desiccant concentration. Changing the desiccant concentration will change the temperature and/or humidity of the supplied air.

In one embodiment, a control system can adjust the heat flow in response to inlet and/or outlet temperature and/or humidity sensor sensed data of the inlet air stream entering the liquid desiccant system and/or the supply air stream exiting the liquid desiccant system. These adjustments affect the moisture removal rate of the cooling section (by adjusting the temperature of the cooling unit and thus the amount of water condensed out of the air) and the moisture removal rate of the liquid desiccant absorber (by controlling the desiccant concentration via the amount and/or quality of heat transferred to the desiccant in the desorber). These adjustments affect the low and high temperatures required in the system. If changes in these temperatures result in changes in energy consumption, such as in a heat pump, these dynamic adjustments by the control system can be used to minimize overall energy consumption of the liquid desiccant air conditioning system.

In some implementations, a liquid desiccant air conditioning system can be configured to select the highest temperature of operation of the cooling unit (e.g., also referred to as cooling temperature) that results in a moisture removal rate and desiccant concentration in the absorber that can be desorbed at that minimum condenser temperature, resulting in the lowest compressor lift and highest coefficient of performance (COP) for the refrigeration system.

FIG. 1 is a schematic diagram of the air, water, and heat flows in a liquid desiccant system 100, according to an embodiment. The liquid desiccant system 100 includes a cooling unit 101, an absorber 102, a thermal regenerator 103, which includes a desorber 103B configured to remove moisture from loaded desiccant, and a heating unit 103A to provide heat to the desorber 103B for the moisture removal, and a controller 104. The cooling unit 101 is operably coupled to the absorber 102 and the regenerator 103, and the absorber 102 is operably coupled to the regenerator 103, as shown in FIG. 1. In some embodiments, the system 100 can optionally also include one or more sensors S configured to measure various system conditions, including, for example, temperature, humidity, pressure, and/or any other suitable parameters to assist in operation and control of the system 100. In such embodiments, the sensors S can be placed in any suitable location within the system 100. For example, as shown in FIG. 1, one or more sensors can be placed to measure the temperature of air 111 exiting the cooling unit 101; one or more sensors can be placed to measure the temperature and humidity of the supply air 112 exiting the absorber 102; and one or more sensors can be placed to measure the air 115 exiting the regenerator 103 (and more specifically, the desorber 103B), as described in further detail below. In some embodiments one or more sensors can be placed to measure one or more parameters of the heating unit and/or cooling unit such as the temperatures of these units. In the case where these units are operably connected to each other via a heat pump, one or more sensors can be placed to measure the operating parameters of the heat pump such as the discharge pressure (which can be also used to determine the condensing temperature), condensing temperature, suction pressure (which can also be used to determine the evaporating temperature), and/or evaporating temperature.

The liquid desiccant may be any suitable liquid desiccant. In some implementations, the liquid desiccant can be a halide salt solution, including, for example, sodium chloride (NaCl), potassium chloride (KCl), potassium iodide (KI), lithium chloride (LiCl), copper(II) chloride (CuCl$_2$), silver chloride (AgCl), calcium chloride (CaCl$_2$)), chlorine fluoride (ClF), bromomethane (CH$_3$Br), iodoform (CHI$_3$), hydrogen chloride (HCl), lithium bromide (LiBr), and/or hydrogen bromide (HBr). In some embodiments, the halide salt solution is selected from LiCl, NaCl, LiBr, and/or CaCl$_2$). In some embodiments, the halide salt solution is LiCl. In some implementations, the solution may be water and described as an aqueous solution. The halide salt may be present in the liquid desiccant in a range from about 2% to about 50% wt, or in a range from about 10% to about 40% wt, or in a range from about 20% to about 40% wt.

The controller 104 is operably coupled (e.g., physically and/or wirelessly/remotely) to the cooling unit 101, absorber 102, the regenerator 103, and the sensors S. The controller 104 can be any suitable controller configured to send signals to and/or receive signals from the cooling unit 101, absorber 102, the regenerator 103, and the sensors S, to monitor and control operation (e.g., setpoints) of the same. The controller 104 can include a memory (not shown), a processor (not shown), and an input/output (I/O) device (not shown).

The cooling unit 101 may be any suitable heat sink configured to remove heat from the air, such as, for example, a refrigerant-to-air coil, a chilled water coil, indirect evaporative cooler, and/or the like. As described in more detail herein, and shown in FIG. 1, the cooling unit 101 is configured to receive and cool inlet air 110 to a cooling temperature (also referred to as a precool temperature setpoint) to produce a cooled air 111. In some embodiments, the cooling temperature can be equal to and/or lower than the saturation temperature of the inlet air 110 (e.g., the inlet air 110 is cooled in the absorber 102 up to or beyond the inlet air's dew point) to thereby condense moisture and/or water from the inlet air 110 and produce condensate at condensate moisture removal rate 131. That is to say, in some embodiments the cooling unit 101 can cool and/or precool the inlet air 110 effectively conducting a first stage and/or step dehumidification of the inlet air 110 in which moisture and/or water is removed from the inlet air 110 to produce a cooled air 111 and a condensate at a condensate moisture removal rate 131. The cooled air 111 can then be further dehumidified in a second stage and/or step dehumidification in the absorber 102, as further described herein. In some implementations, the cooling unit 101 includes a cooling coil that is an evaporator of a heat pump. In some embodiments, the liquid desiccant system 100 can include a sensor disposed between the cooling unit 101 and the absorber 102, as shown in FIG. 1. In some implementations, this sensor can be configured to measure the cooling temperature, a humidity of the cooled air 111, or both. The sensor can then send a signal to the controller 104 such that the controller 104, in response to receiving the signal, adjusts at least one of the cooling temperature, the absorber moisture removal rate 132 or the desorber moisture rejection rate 103, as further described herein.

The absorber 102 is configured to receive the cooled air 111 which has been cooled and may be partially dehumidified by cooling unit 101. The absorber 102 can be configured to further dehumidify the cooled air 111 by interfacing (e.g., exposing) the cooled air 111 with a concentrated liquid desiccant 121, causing absorption of water vapor from the cooled air 111 into the concentrated liquid desiccant 121 and formation of a supply air 112, as described in further detail herein. The concentrated liquid desiccant 121 can absorb water vapor from the cooled air 111 at an absorber moisture removal rate 132. The absorber 102 defines a liquid/air and/or liquid/gas interface and may be formed by any vapor/liquid mass transport unit operation, including, for example, packed beds, tray towers, spray towers, bubble columns, membranes, and/or the like. As the concentrated liquid desiccant 121 absorbs water vapor from the cooled air 111, the concentration of liquid desiccant decreases. The liquid desiccant produced in the absorber 102 after exposure to the cooled air 111 can be referred to as a loaded liquid desiccant 120. The loaded liquid desiccant 120 can be regenerated (by removing the moisture and/or water from the loaded liquid desiccant 120), so that it can then be used again in the absorber 102 to remove additional water vapor (e.g., moisture) from the cooled air 111.

To that end, the regenerator 103 is configured to regenerate the loaded liquid desiccant 120. More specifically, the desorber 103B of the regenerator 103 is configured to receive the loaded liquid desiccant 120 from the absorber 102, remove moisture and/or water from the loaded liquid desiccant 120, produce the regenerated and/or concentrated liquid desiccant 121, and then convey the regenerated and/or concentrated liquid desiccant 121 back to the absorber 102. The desorber 103B defines a liquid/air and/or liquid/gas interface that may be formed by any vapor/liquid mass transport unit operation, including, for example, packed beds, tray towers, spray towers, bubble columns, membranes, and the like. The desorber 103B can be coupled to the absorber 102 to receive the loaded liquid desiccant 120 and then remove moisture and/or water from the loaded liquid desiccant 120 at a desorber moisture rejection rate 133. The regenerator 103, in this embodiment contains a heating unit 103A configured to convey to the desorber 103B heat via a pre-heated air stream 114 to separate the moisture and/or or water from the loaded liquid desiccant 120 in the desorber 103B. In some embodiments, heat and/or heated air can be conveyed to the desorber 103B in other ways, e.g., without a heating unit in the regenerator, as described in further detail herein. In some embodiments, the liquid desiccant system 100 can include a sensor disposed between the heating unit 103A and the desorber 103B, as shown in FIG. 1. In some implementations, this sensor can be configured to measure a temperature of the pre-heated air stream 114 and send a signal to the controller 104 such that the controller 104, in response to receiving the signal, adjusts at least one of the cooling temperature, the absorber moisture removal rate 132 or the desorber moisture rejection rate 103, as further described herein.

The heating unit 103A can provide heat from one or more of any suitable sources, including, for example, excess heat 118 from the cooling unit 101, as illustrated in FIG. 1. Other examples include electric heat, gas-fired heat, hot water, steam, solar heat, geothermal heat, and/or the like. In some implementations the heating unit 103A can include a fan and a heating coil that can be used to transfer heat to the regeneration air 113 to produce the pre-heated air stream 114. The controller 104 can be operably coupled to the heating unit 103B to change and/or modify a volume of air passing through the heating coil to control the temperature of the pre-heated air stream 114. For example, in some implementations the volume of air passing through the heating coil can be controlled by changing a speed of the fan in the heating unit 103A, and/or a pressure drop of the air passing through the heating coil. In some implementations, the heating unit 103A includes a condenser of a heat pump to transmit heat to a regeneration air 113. In some implementations, the heat pump can cool the evaporator and heat the condenser. In use, in some implementations, the heat pump may be capable of operating at variable flow (e.g., adjusting a flowrate of a refrigerant and/or working fluid circulating within the heat pump) to change the amount of heat transported between the evaporator and condenser, thereby providing the system 100 is controllability. For example, in some embodiments the heat pump may be capable of adjusting a speed of a refrigerant compressor to alter, change, and/or modify the mass flow rate of refrigerant circulating within the heat pump.

Although not shown, in some embodiments, the regenerator 103 can be an electrochemical regenerator (and as such may not include a heating unit) and would use an electric current to regenerate the loaded liquid desiccant 120 and produce regenerated and/or concentrated liquid desiccant 121.

Although not shown, in some embodiments, the system 100 may include an auxiliary condensing coil configured to receive an external air stream other than the regeneration air stream (113 to 114) to remove unneeded heat from the system 100. For example, in some embodiments the system 100 may include an auxiliary condensing coil configured to receive an external air stream and flow the external air stream through the heating unit 103A to remove unneeded heat generated in the cooling unit 101. In such embodiments, in some implementations, one or more valves may be included (e.g., one or more vales disposed between the auxiliary condensing coil and a condenser of the heating unit 103A) to provide the ability to vary (e.g., with the aid of the controller 104) the amount of heat sent to the heating unit 103A vs. the external air stream. In some implementations, the amount of heat sent to the heating unit 103 can be adjusted by varying a speed of a fan drawing the external air stream t the auxiliary condensing coil. Alternatively, in some implementations, the amount of heat sent to the heating unit 103 can be adjusted by varying a pressure drop of the external air stream.

In use, inlet air 110 enters the cooling unit 101 and is cooled to a predetermined and/or preferred cooling temperature (also referred to as a precool temperature setpoint) within the cooling unit 101. If the dew point of inlet air 110 is higher than the precool temperature setpoint, moisture and/or water will be condensed out of the inlet air 110, forming (a) a condensate at a condensate moisture removal rate 131, and (b) a cooled air 111 (also referred to as precooled air 111). Said in other words, in some embodiments the cooling unit 101 can receive the inlet air 110, cool the inlet air 110 (e.g., reduce the enthalpy of the inlet air 110) to a predetermined and/or preferred cooling temperature (e.g., a temperature lower than the dew point of the inlet air 110) which results in a first stage and/or step dehumidification of the inlet air 110 and producing a cooled air 111 (at a cooled air humidity) which can be further dehumidified in the absorber 102, as further described herein. The cooled air 111 can exit the cooling unit 101 and then be directed and/or flown from the cooling unit 101 to the absorber 102, where the cooled air 111 is introduced to a concentrated liquid desiccant 121 flowing within the absorber 102. Exposure of the cooled air 111 to the concentrated liquid desiccant 121 causes absorption of water vapor from the air stream 111. The absorption of water vapor from the cooled air 111 into the concentrated liquid desiccant 121 dehumidifies the cooled air 111 and produces a supply air 112 at a target supply air temperature and humidity, and a loaded liquid desiccant 120, as shown in FIG. 1. In some embodiments, the absorption of water vapor from the cooled air 111 in the absorber 102 can constitute a second stage and/or step dehumidification of inlet air 110 (e.g., after the inlet air 110 is flown through the cooling unit 101 and is cooled to a predetermined temperature lower than the dew point of the inlet air 110). Supply air stream 112 exits the absorber 102 at a supply air humidity and temperature setpoint. The loaded liquid desiccant 120 (i.e., the liquid desiccant after having absorbed water vapor from the cooled air 111 within the absorber 102) is transferred from the absorber 102 to the regenerator 103 (in this case, the desorber 103B of the regenerator). In some embodiments the desorber 103B can expose the loaded liquid desiccant 120 to a pre-heated air stream such as pre-heated air 114 in FIG. 1. In some embodiments, the pre-heated air 114 maybe produced by flowing a regeneration air 113 through the heating unit 103A. In some embodiments, the heating unit 103A can be configured to heat the regeneration air 113 by transferring, for example, heat from the heat absorbed in the cooling unit 101 using a heat pump (not shown). The pre-heated air stream 114 can enter the desorber 103B and come in contact with the loaded liquid desiccant 120 flowing and/or circulating within the desorber 103B, thereby absorbing water from the loaded liquid desiccant 120 and regenerating the loaded liquid desiccant 120 to create the regenerated and/or concentrated liquid desiccant 121, which can then be used in the absorber 102. The regenerated and/or concentrated liquid desiccant 121 is then returned from the desorber 103B to the absorber 102. In some embodiments, the liquid desiccant system 100 can optionally include an auxiliary condensing coil configured to receive an external air stream (other than the regeneration stream 113 or 114) to remove unneeded heat from the heating unit 103A. In some embodiments, a user and/or subject may want to use the liquid desiccant system 100 to produce a supply air 112 having a predetermined and/or preferred supply air humidity and temperature. The controller 104 may be operably coupled to the cooling unit 101, the absorber 102, and the regenerator 103 to adjust and/or control one or more parameters of the liquid desiccant system 100 such as for example, a flowrate of inlet air stream 110, a cooling temperature in the cooling unit 101, an amount of heat transferred and/or directed to the desorber 103b, and/or a concentration of the liquid desiccant directed to the absorber 102, to produce a flowrate of a supply air 112 at the predetermined (e.g., target) supply humidity and temperature, as further described herein. In some implementations, the liquid desiccant system 100 can include a sensor disposed downstream of the absorber 102, as shown in FIG. 1. This sensor can be configured to measure the air supply temperature, and/or the air supply humidity, and then send to the controller 104 a signal indicative and/or associated to the measured air supply temperature and/or air supply humidity. The controller 104 can receive the signal from the sensor and determine a temperature difference between the measured air supply temperature and a target air supply temperature stored in a memory of the controller 104. Similarly, the controller 104 can be configured to determine a humidity difference between the measured air supply humidity and a target air supply humidity stored in the memory of the controller 104. In some implementations the controller 104 can be further configured to determine, based on the measured air supply temperature and air supply humidity, other characteristics and/or properties of the air supply such as, for example, an air supply dry bulb temperature and/or an air supply dew point. The controller can store additional target parameters and/or characteristics of the supply air stream target defined by a user. For example, the controller 104 can be configured to store a target supply air dew point, and/or a target supply air dry bulb temperature. In such implementations, the controller can determine, for example, a difference between a received air supply humidity and a target air supply dew point, or a difference between a supply air dry bulb temperature and a target supply air dry bulb temperature. In some implementations, the controller 104 can be configured to adjust one or more operating conditions of the liquid desiccant system 100 to keep the air supply humidity within 0.10 degrees, within 0.20 degrees, within 0.25 degrees, within 0.50 degrees, within 1.0 degree, within 2.0 degrees, within 3.0 degrees, or within 5.0 degrees of a target air supply dew point. In some implementations, the controller 104 can be configured to adjust one or more operating conditions of the liquid desiccant system 100 to keep the air supply dry bulb temperature within 0.10 degrees, within 0.20 degrees, within 0.25 degrees, within 0.50 degrees, within 1.0 degree, within 2.0 degrees, within 3.0 degrees, or within 5.0 degrees of a target air supply dry bulb temperature.

The condensate moisture removal rate 131 (as discussed in further detail with respect to FIG. 2A, with reference to 231) is substantially determined by the flow rate and absolute humidity of the inlet air 110 and the temperature of the cooling coil (not shown) within the cooling unit 101. The absorber moisture removal rate 132 (as discussed in further detail with respect to FIG. 2A, with reference to 232) is substantially determined by the cooled air 111 flow rate and the concentration of the desiccant stream 121. The absorber moisture removal rate 132 (as discussed in further detail with respect to FIG. 2A, with reference to 232) can be determined by moisture data measured by a sensor at 111 and at 112 (i.e., upstream and downstream the absorber 102). The desorber moisture rejection rate 133 (as discussed in further detail with respect to FIG. 2A, with reference to 233) is substantially determined by the flow rate and absolute humidity of the regeneration air 113, the concentration of desiccant stream 120, and the temperature at which the pre-heated air stream 114 is delivered. Accordingly, stable operation of the unit results when the moisture absorber rate in the absorber 102 equals the desorber moisture rejection rate 133 in the regenerator 103. This state can be achieved by controlling the temperature of the cooling unit 101 and the temperature of the heating unit 103A. Further, the rate at which the system becomes stable is set by the liquid desiccant concentration which in turn has been set by the rates of moisture accumulation in the absorber (e.g., the absorber moisture removal rate 132) and regeneration in the desorber (e.g., the desorber moisture rejection rate).

In some implementations, it is desirable to control both the temperature and humidity of the supply air stream 112. This may be achieved by delivering a particular temperature of air stream 111 and concentration of liquid desiccant stream 121 to absorber 102. The concentration of the desiccant stream 121 may be controlled by controlling the desorber moisture rejection rate 133 of the regenerator 103 which in turn can be controlled by controlling one or more of the following parameters: the temperature of the pre-heated air stream 114, the amount and/or quality of heat input (e.g., from heating unit 103A) to the desorber 103B, the amount of regeneration air 113 delivered to the regenerator 103, and/or the flow rate of the liquid desiccant 120 & 121 flowing between the absorber 102 and the desorber 103B. In some embodiments, e.g., in implementations in which the regenerator is an electrochemical regenerator, the regeneration rate of the regenerator can be controlled by the amount of current delivered.

In some implementations, a volume of desiccant in the system is relatively large, making changes in desiccant concentration 121 slower than the cooling unit 101 can change temperature to impart a desired change to the supply air 112. In the event of a rapid change in the required moisture removal rate of the liquid desiccant system 100 (e.g., the change is required in a time period not reachable by changes to the desiccant concentration alone), the control system 104 can increase the condensate moisture removal rate 131 by decreasing the cooling temperature and/or precool temperature setpoint of cooled air 111 until the liquid desiccant concentration in the concentrated liquid desiccant 121 can be sufficiently increased to increase the absorber moisture removal rate 132, as described in more detail with respect to FIGS. 2A-C.

In some implementations, a heat pump (not shown) can be used to move a heat stream 118 from the cooling unit 101 to the heating unit 103A. The coefficient of performance of the heat pump, and therefore its energy consumption, increases with decreasing difference between the temperature of the cooling unit 101 and the heating unit 103A. However, in some instances, it is the state of supply air 112 that is desired to be controlled to a target temperature, humidity, or both. Therefore, to accommodate such instances, the energy consumption of the heat pump could potentially be minimized by maximizing the temperature of the cooling unit 101 and minimizing the temperature of the heating unit 103A while simultaneously satisfying the target setpoints (target temperature and/or humidity) of the state of supply air 112.

Figure 2A:
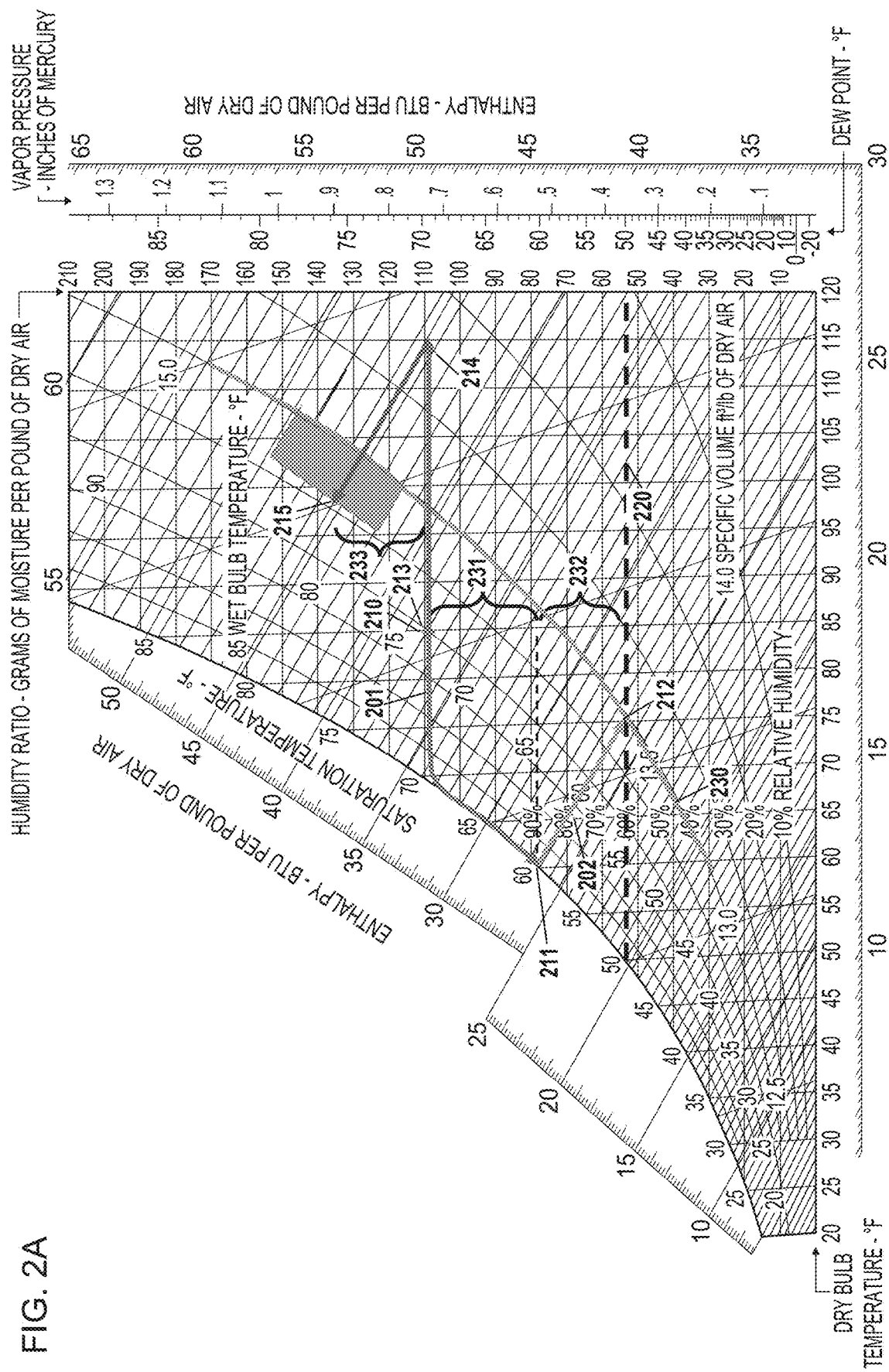
FIG. 2A is a psychrometric diagram of an illustrative liquid desiccant system process, according to an embodiment.
Figure 2B:
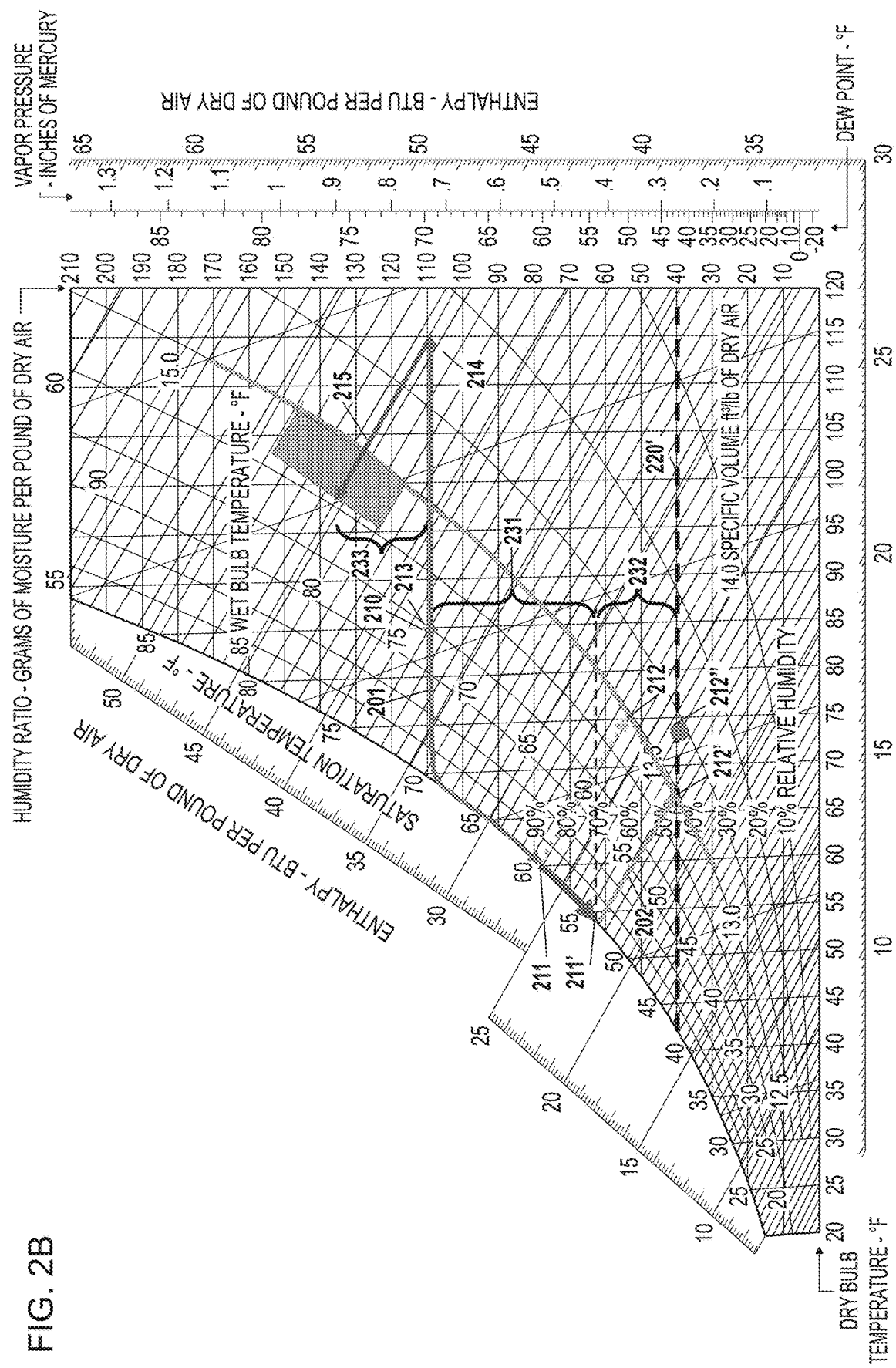
FIGS. 2B and 2C are psychometric diagrams illustrative of operation modes of a liquid desiccant system that prioritizes supply air dew point relative to supply air dry bulb temperature, according to an embodiment.
Figure 2C:
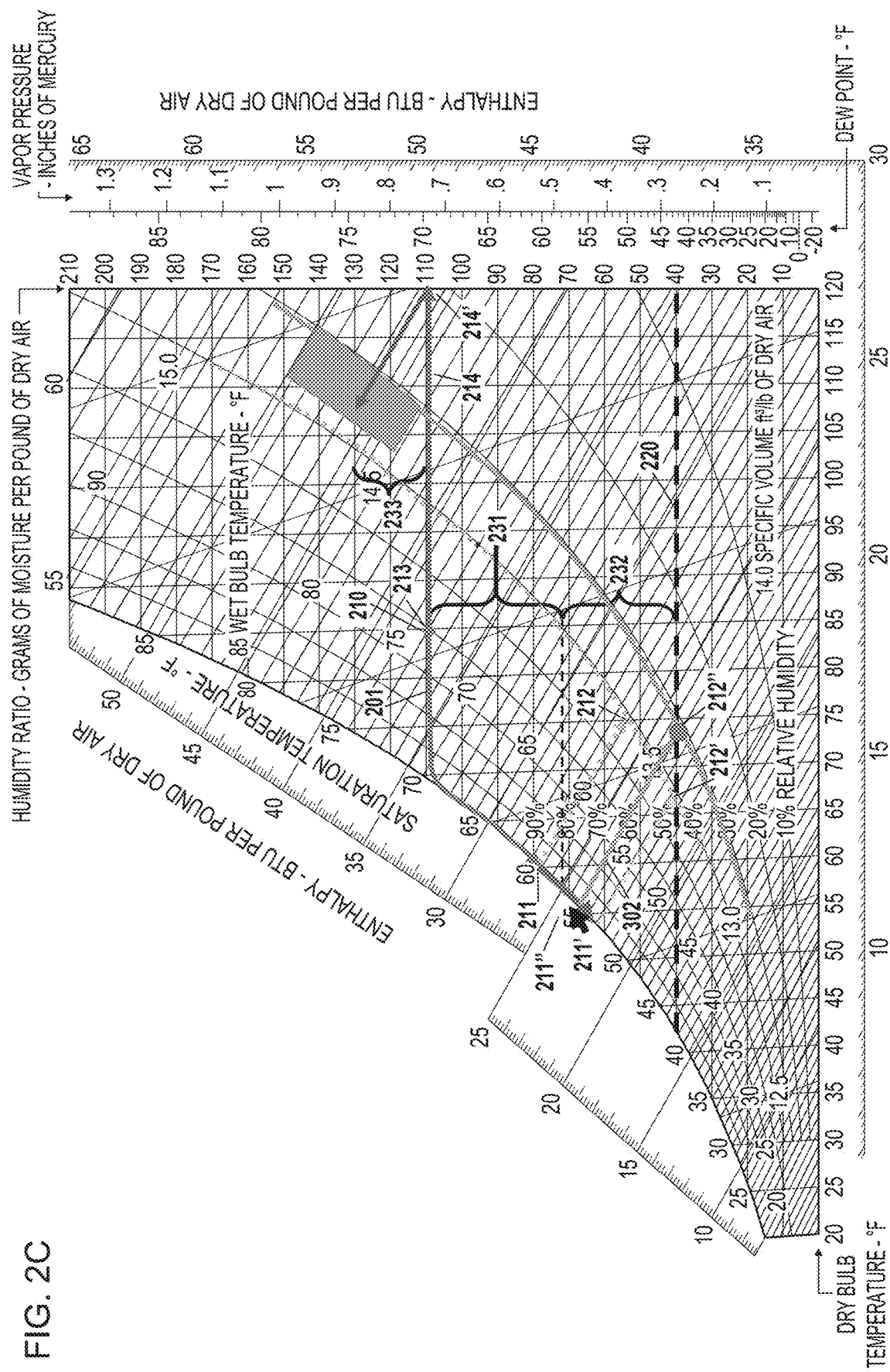

FIGS. 2A-2C show psychrometric diagrams of an illustrative liquid desiccant system process, according to an embodiment, and illustrates how the system may manipulate the condensation moisture removal rate and absorber moisture removal rate to achieve a desired system moisture removal rate. The system can be, for example, similar to or the same as, in function and/or form, any of the liquid desiccant systems described herein, e.g., system 100.

Various control protocols may be employed by any of the liquid desiccant control systems described herein. In some cases, for example, the control system may adjust the rate at which the regenerator removes water from the desiccant in the regenerator (e.g., the desorber moisture rejection rate) for example by increasing the quality or amount of heat entering the desorber to match the collection rate of water in the absorber (e.g., the absorber moisture removal rate). In some cases, the control system may further adjust the rate of regeneration to change the concentration of the desiccant to achieve a desired temperature and/or humidity of air in the supply air outlet. In some cases, the control system can adjust the temperature of a cooling coil in the cooling unit, and adjust the desiccant concentration, to independently control the temperature and humidity of the supply air. In some cases, the temperature of the cooling coil in the cooling unit may be adjusted without colleting and/or regenerating moisture to cool the supply air. In some cases, the temperature of the cooling coil and the desiccant concentration can be varied to optimize (e.g., minimize energy usage) to provide supply air at a desired humidity (e.g., humidity ratio or absolute humidity) at the supply air outlet.

The regeneration rate (e.g., the desorber moisture rejection rate) can be varied in one or more manners, including, for example, for thermal regeneration systems, adjusting the temperature of the heated coil; adjusting the heat provided to the heated coil; adjusting the amount of heat transferred into the air in the regeneration pathway vs external coil (e.g., unneeded heat) (e.g., by varying the flow of refrigerant to each coil and thus the amount of unneeded heat available to be removed from the system by the second condensing coil in the external air stream; and/or by varying the airflow across the external coil and thus the heat available for regeneration by the heating coil); adjusting the air flow rate across the heating unit and/or desorber, adjusting the desiccant flow rate (e.g., modulation, and/or on/off as needed). The regeneration rate can be varied in one or more manners, including, for example, for electrochemical regeneration systems, by varying the voltage across the device, the flow path within the device, and/or the flow rate of desiccant to the device.

The temperature of the evaporator can be varied, for example, by changing the flow rate of refrigerant (e.g., by varying the speed of the compressor, by operating one or more compressors in tandem), and/or by modulating the amount of refrigerant sent through a hot-gas bypass.

In some embodiments, the control system can be configured to operate in several modes, and switch between modes automatically (e.g., based on sensed data and/or user inputs of set points) including, for example, entering a dehumidification mode when the supply inlet dew point is at higher dew point than the desired supply outlet; entering a cooling mode when the supply inlet is at a higher dry bulb than the desired supply outlet dry bulb; entering a ventilation mode when the supply air inlet is at a lower dry bulb and lower dew point than the desired supply outlet dew point and dry bulb; and/or transitioning between states as the supply inlet air changes such that appropriate delays and dead bands are applied.

In some embodiments, any of the liquid desiccant systems described herein may include two proportional-integral-derivative controllers and control loops, including a loop that monitors the supply air dew point, and when too high compared to the desired target, the system can lower the cooling temperature in the cooling unit, and when too low compared to the desired target, the system can raise and/or increase the cooling temperature in the cooling unit; and a loop that monitors the actual supply air temperature (e.g. the air supply temperature measured with the sensors S) and supply air target temperature, and accordingly determines the appropriate desiccant concentration which it controls by determining how much water to regenerate in the desorber, e.g., by how much heat to convey to the desorber—if actual supply temperature is less than supply target temperature, the system can decide to increase the amount of heat to the regenerator to increase the desiccant concentration and thus to increase the actual supply temperature while the first loop maintains the desired supply air dew point.

FIGS. 2A-2C illustrate using a psychometric chart how a liquid desiccant air conditioner control system 2000 (including any of the control systems described herein) can condition air to meet target humidity and temperature set points. The liquid desiccant system 200 can be structurally and/or functionally similar to the liquid desiccant system 100 described above with reference to FIG. 1. For example, the liquid desiccant system 200 can include one or more components that are structurally and/or functionally similar to components of the liquid desiccant system 100. Consequently, no further details regarding the components of the liquid desiccant system 200 are provided herein.

As shown in FIG. 2A, in this example, inlet air 210 has a certain temperature and humidity shown on the diagram (about 85 degrees F. dry bulb and about 70 degrees F. dew point), and a target temperature and target dew point for the supply air 212 are set to about 75 degrees F. dry bulb and about 50 degrees F. dew point. The inlet air can be cooled and dehumidified (illustrated along the line 201 in FIG. 2A), e.g., by a cooling unit similar to the cooling unit 101 described above with reference to FIG. 1, to a cooling temperature and/or precool temperature 211. As the dew point of inlet air 210 is above the dew point of the precool temperature 211, water is condensed out of the air, resulting in a condensate moisture removal rate 231. This is illustrated by the line 201 that first traverses horizontally to its left as it is cooled and until it reaches its dew point or saturation temperature, at which point additional cooling results in condensation (and dehumidification), as illustrated with the line 201 traversing down left along the saturation curve, to 211. The cooling unit 201 produces a cooled air 211 which is further dehumidified by a liquid desiccant at a concentration with equilibrium vapor pressure 230 in a liquid desiccant absorber similar to the absorber 102 described above with reference to FIG. 1. The liquid desiccant absorbs water vapor from the cooled air 211 as illustrated by the line 202 in FIG. 2A, resulting in absorber moisture removal rate 232. The result of these two processes is a supply air 212 at target temperature and state 212, which is at the target dew point 220. So, described another way, with a target temperature and dew point for the supply air 212, the inlet air 210 can be selectively cooled and dehumidified to a target enthalpy, and then further dehumidified (and heated) at or near constant enthalpy to reach the target temperature and humidity set points for the supply air 212.

Also as illustrated in FIG. 2A, the heat required for regeneration, which in some embodiments is moved (e.g., by the cooling unit) from the inlet air 210 to the regeneration air stream, 213, preheats the airstream entering the desorber (as illustrated by the horizontal line connecting 213 and 214). In some implementations this air stream to be preheated, 213, is at the same inlet conditions as the inlet air 210 to the cooling unit 201 (or at least substantively similar, e.g., if coming from the same or similar environment). The preheated air 214 is used to heat and thereby regenerate the loaded liquid desiccant (as illustrated by the line connecting 214 and 215 traversing up and to its left and towards the constant relative humidity line 230 and exiting the desorber at 215). In some implementations, the temperature and/or amount of the pre-heated air 214 entering the desorber can be measured with a sensor, and used to control the desorber moisture rejection rate 233, i.e., the regeneration rate of the desorber.

As illustrated in FIG. 2B, the supply air conditions are changed from FIG. 2A from about 75 degrees F. dry bulb and about 50 degrees F. dew point (212) to about 73 degrees F. dry bulb and about 40 degrees F. dew point (212"), e.g., by an operator who desires less humid air or by a controller with a schedule of temperature set points. In one operating mode, e.g., a mode that prioritizes the supply air dew point, the system gives priority to reaching the target dew point of 40 degrees F. (220') by relatively quickly lowering the temperature of the air leaving the cooling unit from 211 to 211'. As a result, the supply air 212' leaving the absorber is at the target dew point (220'), but the target temperature for the supply air has decreased to about 67 degrees F. dry bulb.

Next, as illustrated in FIG. 2C, the desiccant concentration can relatively slowly be increased (e.g., in a thermal regeneration system, by increasing the quality and/or amount of heat entering the desorber via the pre-heated air 214, e.g., by raising the heat of the condenser, as illustrated by the line connecting 213 and 214' and extending further to the right, i.e., from 214 to 214'). As long as the desorber moisture rejection rate 233 exceeds the absorber moisture removal rate 232 the desiccant will continue to concentrate. Accordingly, the absorber moisture removal rate 232 will continue to increase until the system regains equilibrium; the desorber moisture rejection rate 233 is set, and thereby the temperature of the air used for regeneration 214', to meet the desired supply air conditions 212". As the desiccant concentrates the additional cooling just previously applied can be scaled back, e.g., from 211' to 211", to meet the target dew point and temperature in an energy efficient manner.

Figure 3A:
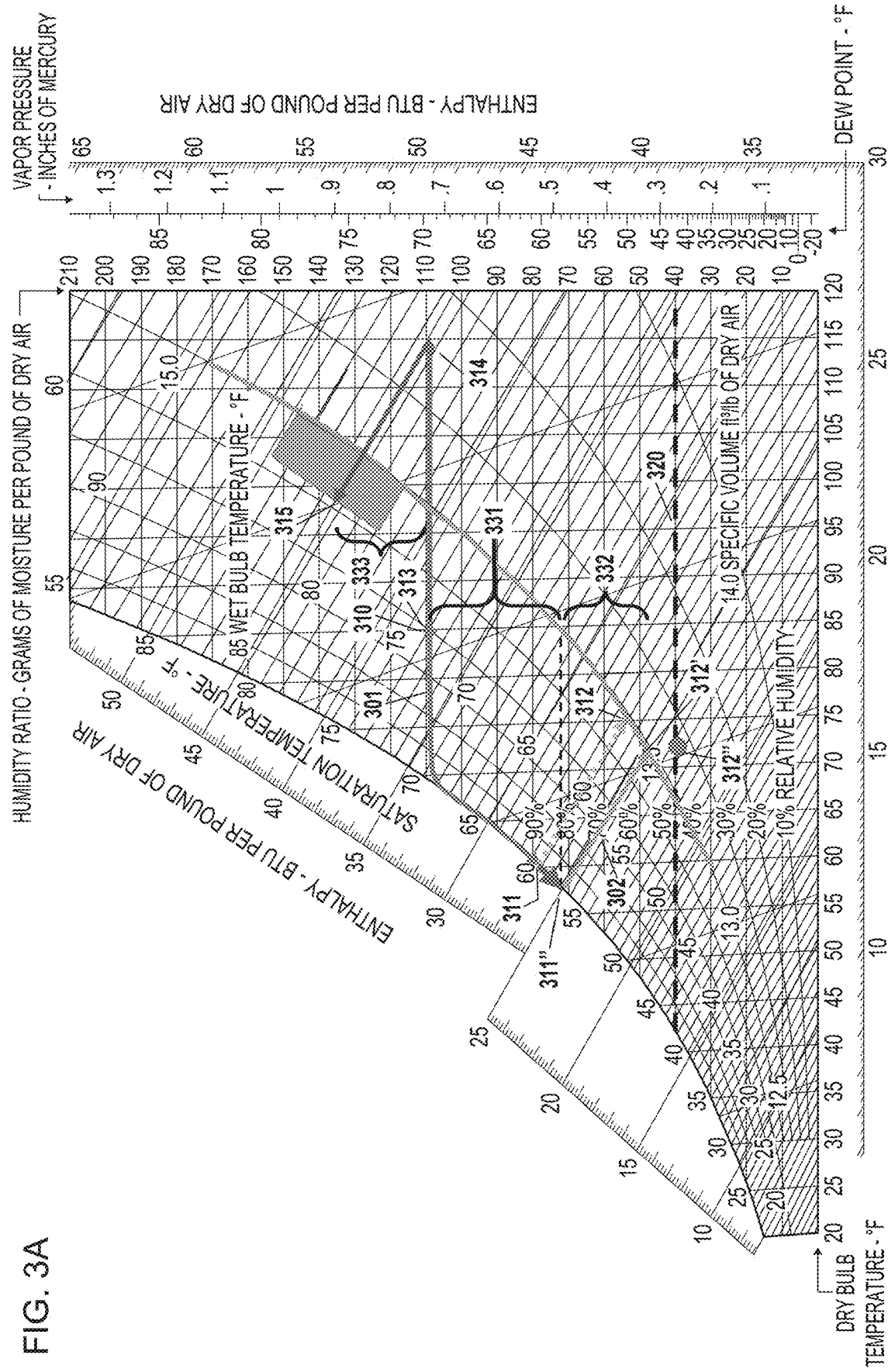
FIGS. 3A and 3B are psychrometric diagrams illustrative of an operation mode of a liquid desiccant system that prioritizes supply dry bulb temperature relative to supply air dew point, according to an embodiment.
Figure 3B:
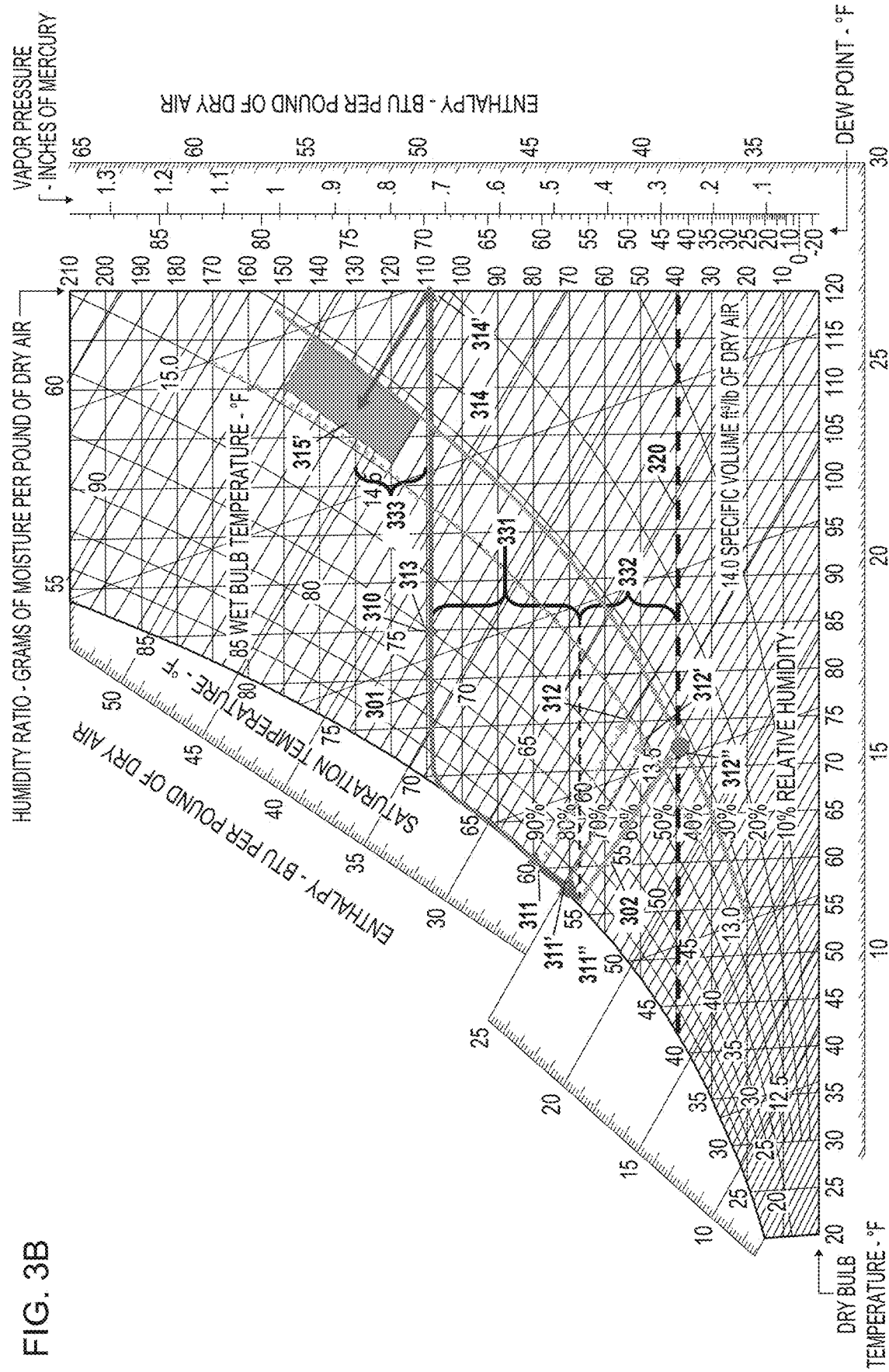

FIGS. 3A and 3B demonstrate another operation mode of a liquid desiccant system 300, e.g., one that gives priority to the supply dry bulb temperature rather than the supply air dew point. The liquid desiccant system 300 can be structurally and/or functionally similar to the liquid desiccant system 100 and/or 200 described above. For example, the liquid desiccant system 300 can include one or more components that are structurally and/or functionally similar to components of such system. Consequently, no further details regarding the components of the liquid desiccant system 300 are provided herein. In FIG. 3A. the supply air conditions are changed from FIG. 2A from about 75 degrees F. dry bulb and about 50 degrees F. dew point (212) to about 73 degrees F. dry bulb and about 40 degrees F. dew point (312"), e.g., by an operator who desires less humid air or by a controller with a schedule of temperature set points. The system gives priority to reaching the target dry bulb temperature of 73 degrees F. (312') by relatively quickly lowering the temperature of the air leaving the cooling unit from 311 to 311'. As a result, the supply air 312' leaving the absorber is at the target dry bulb temperature point (312'), but the supply air 312' dew point for the supply air has only decreased to about 45 degrees, and has not yet reached the target dew point 312".

Next, as illustrated in FIG. 3B, the desiccant concentration can relatively slowly be increased (e.g., in a thermal regeneration system, by increasing the quality and/or amount of heat entering the desorber via the pre-heated air stream 114, e.g., by raising the heat of the condenser, as illustrated by the line connecting 313 and 314' and extending further to the right, i.e., from 314 to 314'). As long as the desorber moisture rejection rate 333 exceeds the absorber moisture removal rate 332 the desiccant will continue to concentrate. Accordingly, the absorber moisture removal rate 332 will continue to increase until the system regains equilibrium; the desorber moisture rejection rate 333 is set, and thereby the temperature of the air used for regeneration 314', to meet the desired supply air conditions 312". As the desiccant concentrates the additional cooling just previously applied can be decreased, e.g., from 311' to 311", to meet the target dew point and temperature in an energy efficient manner.

Figure 4:
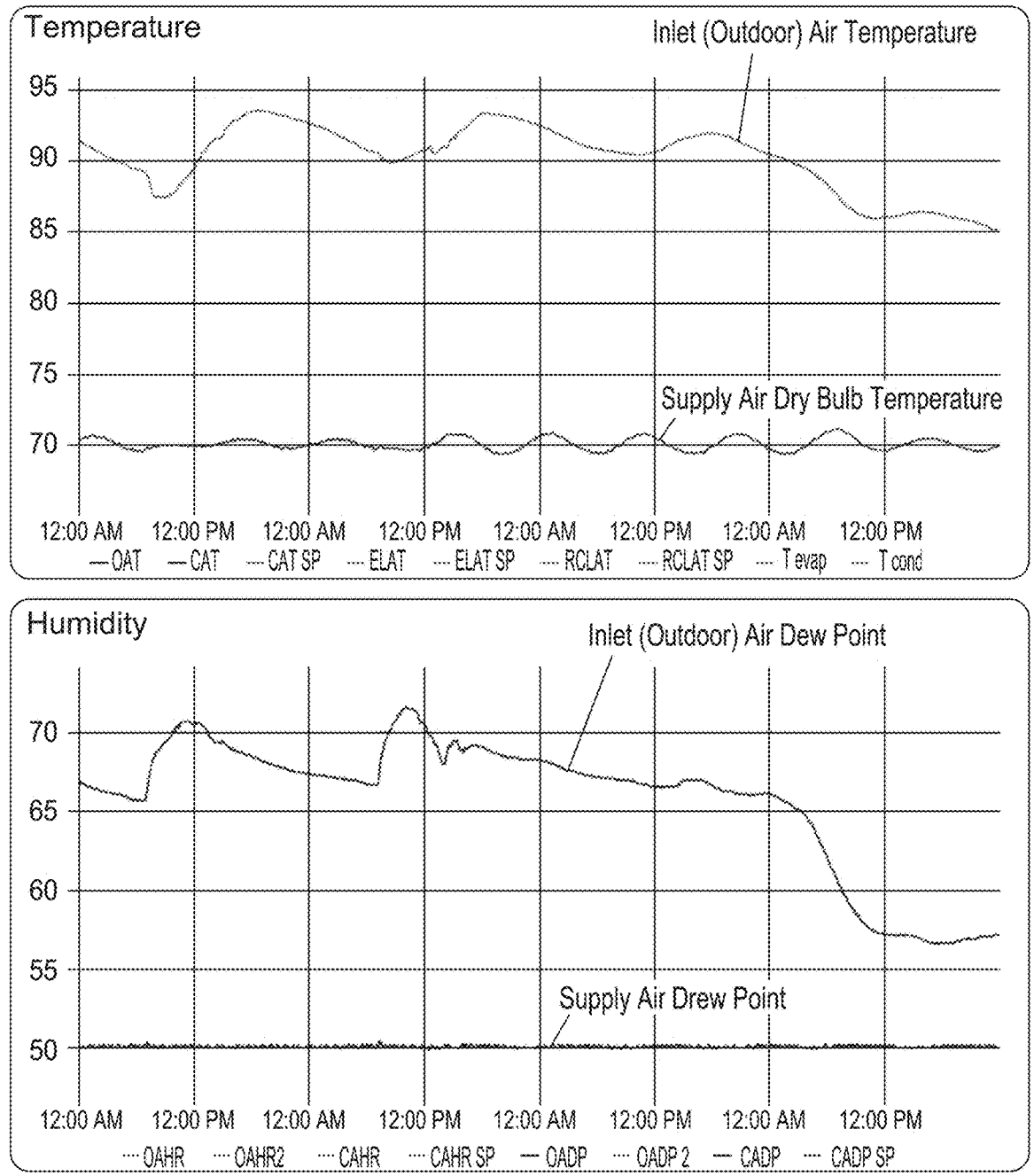
FIG. 4 shows the performance of a liquid desiccant system according to an embodiment.

FIG. 4 shows the performance of a liquid desiccant system 400. The liquid desiccant system 400 can be structurally and/or functionally similar to other liquid desiccant systems including, for example, the liquid desiccant system 100, 200 and/or 300 described herein. For example, the liquid desiccant system 400 can include one or more components that are structurally and/or functionally similar to components of such systems. Consequently, no further details regarding the components of the liquid desiccant system 400 are provided herein. In some embodiments over a relatively long period (e.g., multiple days) the liquid desiccant system 400 may be able to hold the supply air temperature and dew point to within one degree Fahrenheit of the desired (and/or target) supply air dry bulb temperature and one degree Fahrenheit of the desired (and/or target) dew point. FIG. 4 shows the performance of the liquid desiccant system 400 operating on an inlet air stream (e.g., similar to the inlet air 110) operating continuously over an extended period of time. FIG. 4 shows the inlet (i.e., outdoor) air temperature and the inlet (i.e., outdoor) air dew point of the inlet air stream. Despite variations of over 10 degrees Fahrenheit in both temperature and dew point of the inlet air stream the liquid desiccant system 400 produces a supply air stream (e.g., similar to the supply air 112) characterized by a dry bulb temperature and dew point that remain within one degree Fahrenheit of the desired (e.g., target) conditions. The mode of operation of the liquid desiccant system 400 in FIG. 4 represents the conditioning procedure described in FIG. 2, where the dew point is given priority and the control system rapidly changes the evaporator temperature to maintain the dew point while more slowly changing the desiccant concentration. The relatively more stable dew point of the supply air stream is thus demonstrated.

Figure 5:
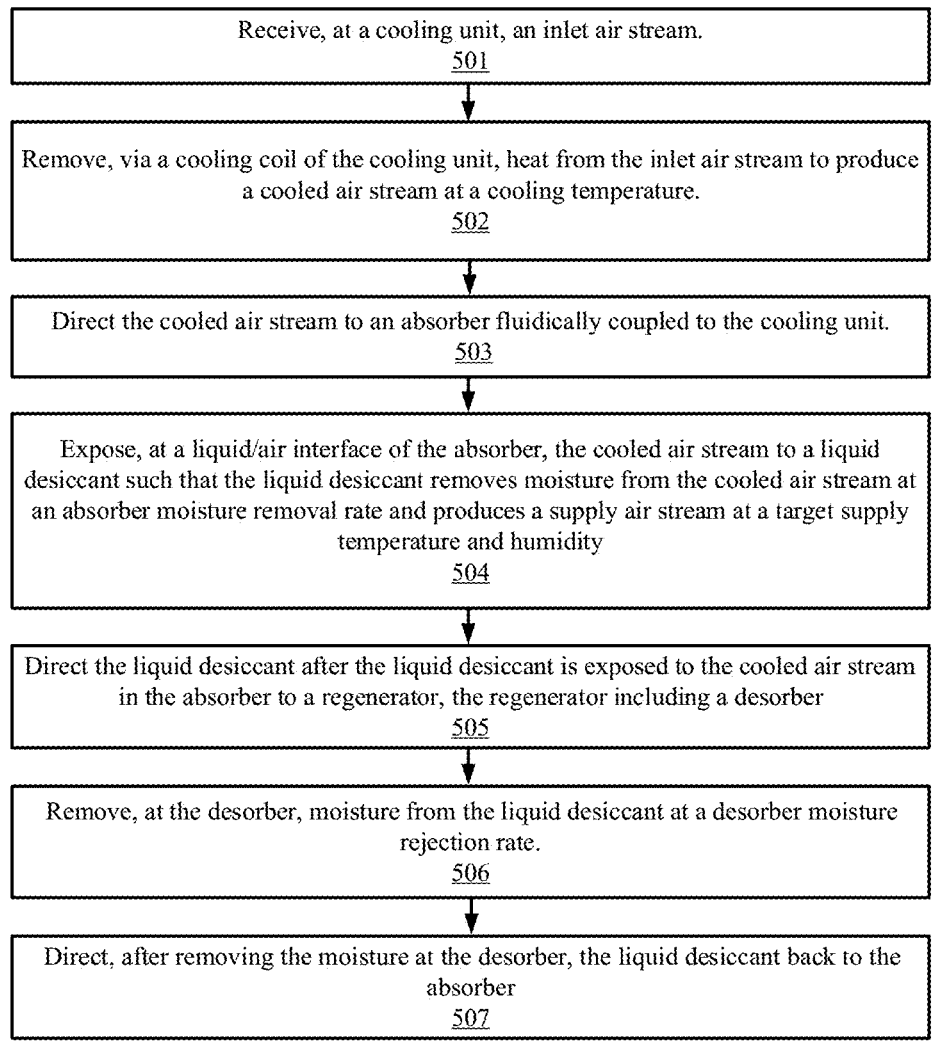
FIG. 5 shows a method for conditioning a supply air stream with a liquid desiccant system, that prioritizes supply air dew point relative to supply air dry bulb temperature, according to an embodiment.

FIG. 5 shows a method 500 for conditioning a supply air stream with a liquid desiccant system 500. The liquid desiccant system 500 can be structurally and/or functionally similar to other liquid desiccant systems including, for example, the liquid desiccant system 100, 200, 300, and/or 400 described herein. For example, the liquid desiccant 500 can include one or more components that are structurally and/or functionally similar to components such systems. Consequently, no further details regarding the components of the liquid desiccant system 500 are provided herein. At step 501, the method 500 includes receiving at a cooling unit (e.g., a cooling unit similar to and/or the same as cooling unit 101) an inlet air stream. In some embodiments, the inlet air stream received at the cooling unit 501 can be characterized by specific temperature and/or humidity conditions. For example, in some embodiments the inlet air stream 510 can be characterized by a dry bulb temperature of about 85° F., and a dew point of about 70° F.

At step 502, the method 500 includes removing, via a cooling coil of the cooling unit, heat from the inlet air stream to produce a cooled air stream at a cooling temperature. In some embodiments a cooling unit can be operably coupled to a control unit (e.g., a controller 104) such that the control unit can adjust an amount and/or quality of heat removed from the inlet air stream. In that way, the liquid desiccant system 500 may produce a supply air stream (e.g., a supply stream 112) at a target supply temperature and humidity. For example, in some instances, a desired temperature and humidity (e.g., a desired dew point and/or a desired dry bulb temperature) can be selected by an operator who desires less and/or more humid air, or by a controller with a schedule of temperature set points. In some instances the control unit can change the amount and/or quality of heat removed from the inlet air stream to adjust the target supply temperature and humidity of the supply air stream such that the target supply temperature is kept within 0.1 degrees, within 0.15 degrees, within 0.2 degrees, within 0.25 degrees, within 0.3 degrees, within 0.5 degrees, within 1.0 degree, within 1.5 degrees, within 2.0 degrees, or within 5.0 degrees of the desired dew point, inclusive of all values and ranges therebetween (for temperatures measured in degrees ° F.). Additionally and/or alternatively, in some instances the control unit can change the amount and/or quality of heat removed from the inlet air stream to adjust the target supply temperature and humidity of the supply air stream such that the target supply temperature is kept within 0.1 degrees, within 0.15 degrees, within 0.2 degrees, within 0.25 degrees, within 0.3 degrees, within 0.5 degrees, within 1.0 degree, within 1.5 degrees, within 2.0 degrees, or within 5.0 degrees of the desired dry bulb temperature of the supply air stream, inclusive of all values and ranges therebetween for temperatures measured in degrees OF.

In some embodiments, the method 500 can optionally include a step 502a (not shown in FIG. 4). At the optional step 502a, the method 500 includes changing, with a control unit operably coupled to the cooling unit, an absorber, and a regenerator, the cooling temperature of the cooled air stream in the cooling unit to adjust an enthalpy change of the supply air stream. In some embodiments the cooling temperature of the cooled air stream can be changed, for example, by changing (e.g., increasing and/or reducing) a mass flowrate of a refrigerant circulating within the cooling coil of the cooling unit. The changes in the mass flowrate of the refrigerant in the cooling coil of the cooling unit can change the cooling temperature of the cooled air stream. Furthermore, in some embodiments, the mass flowrate of the refrigerant can be changed by changing a speed of the refrigerant compressor.

At step 503, the method 500 includes directing the cooled air stream to an absorber (e.g., similar to the absorber 102) fluidically coupled to the cooling unit. The absorber can define a liquid/air and/or liquid/gas interface formed by any vapor/liquid mass transport unit operation, including, for example, packed beds, tray towers, spray towers, bubble columns, membranes, and/or the like. At step 504, the method 500 further includes exposing, at the liquid/air interface of the absorber, the cooled air stream to a liquid desiccant such that the liquid desiccant removes moisture from the cooled air stream at an absorber moisture removal rate and produces a supply stream at a target supply temperature and humidity.

At step 505, the method 500 includes directing the liquid desiccant after the liquid desiccant is exposed to the cooled air stream in the absorber (at step 504) to a regenerator, the regenerator including a desorber. In some embodiments, the liquid desiccant is directed to the regenerator after the liquid desiccant is exposed to the cooled air stream in the absorber with the purpose of removing moisture of the liquid desiccant.

At step 506, the method 500 includes removing, at the desorber, moisture from the liquid desiccant at a desorber moisture rejection rate. In some embodiments, removing moisture from the liquid desiccant at the desorber includes flowing a regeneration stream through a heating unit (e.g., similar to the heating unit 103A) to produce a pre-heated air stream. The pre-heated air stream can be then directed to the desorber. At the desorber, the pre-heated air stream can be exposed to the liquid desiccant after the liquid desiccant is flown in the absorber (and thus containing moisture removed at the absorber moisture removal rate) to remove the water from the liquid desiccant and thus regenerate the liquid desiccant. In some embodiments, the heating unit can be coupled to the desorber and the cooling unit of the liquid desiccant system 500. The heating unit can include a fan and a heating coil. The heating coil can be a condenser of a heating pump configured to transfer heat from the cooling unit (e.g., heat removed to the inlet air stream) to the regeneration stream thus heating the regeneration stream and producing a pre-heated stream at a pre-heated air stream temperature. In some embodiments, the heating unit can be operably coupled to a control unit to adjust and/or change the amount and quality of heat transferred to the regeneration stream. For example, in some embodiments, the control unit can adjust and/or change the amount of heat transferred to the regeneration stream by changing a target temperature of the pre-heated air stream.

In some embodiments, the temperature of the pre-heated air stream can be adjusted and/or changed with the aid of an optional auxiliary condensing coil operably coupled to the liquid desiccant system 500. In such embodiments, the control unit can be operably coupled to the cooling unit, the absorber, the regenerator, and the auxiliary condensing coil. The control unit can send signals to the auxiliary condensing coil such that the auxiliary condensing coil flows an external air stream through the heating unit to remove a portion of the heat transferred from the cooling unit. In some instances, the portion of the heat removed from cooling unit can be unwanted and/or unneeded heat by the desiccant liquid system 500. In some embodiments, the portion of heat removed by the external air stream can be adjusted by varying a speed of a fan (e.g., a fan coupled to the auxiliary condensing coil) drawing the external air stream through the auxiliary condensing coil. Alternatively, and/or optionally, in some embodiments the portion of heat removed by the external air stream can be adjusted by (a) varying a pressure drop of the external air stream, and/or (b) by changing an amount of refrigerant flowing through the auxiliary condensing coil. Lastly, at step 507, the method 500 includes directing, after removing the moisture at the desorber, the liquid desiccant back to the absorber. Directing the liquid desiccant back to the desorber after removing its moisture facilitates the continuous removal of moisture via the exposing the liquid desiccant to the cooled air stream.

FIG. 6 shows a method 600 of operating a liquid desiccant system to produce an air supply stream, e.g., as shown in and described with respect to, FIG. 2. The liquid desiccant system 600 can be structurally and/or functionally similar to other liquid desiccant systems including, for example, the liquid desiccant system 100, 200, 300, 400 and/or 500 described herein. For example, the liquid desiccant 600 can include one or more components that are structurally and/or functionally similar to components such systems. Consequently, no further details regarding the components of the liquid desiccant system 600 are provided herein. At step 601, the method includes receiving, at a control unit operably coupled to a cooling unit, an absorber, and a desorber of the liquid desiccant system, a signal from a sensor disposed downstream of the absorber, the signal indicative of an air supply temperature and an air supply humidity measured by the sensor. In some implementations, the method 600 enables balancing the amount of moisture absorbed by a liquid desiccant in an absorber and removed from the liquid desiccant in a desorber (with the absorber and the desorber being similar to and/or the same as the absorber 102 and the desorber 103B described above with reference to FIG. 1). The control unit can be similar to and/or the same as the controller 104 described above with reference to FIG. 1. For example, the control unit can be operably coupled (e.g., physically and/or wirelessly/remotely) to the cooling unit (e.g., a cooling unit similar to the cooling unit 101), the absorber (e.g., an absorber similar to the absorber 102), the desorber (e.g., a desorber similar to the desorber 103B), and/or a heating unit (e.g., similar to the heating unit 103A) of the liquid desiccant system. Optionally, in some implementations the control unit can also be operably coupled to an external heating unit. In such embodiments, the external heating unit can be coupled to the liquid desiccant system and configured to remove an amount of excess heat from the system. In some implementations the control unit can also be operatively coupled to one or more sensors (e.g., similar to and/or the same as the sensors S with respect to FIG. 1). The control unit can be configured to send signals to and/or receive signals from the cooling unit, the absorber, the regenerator, and the sensors S, to monitor and control operation (e.g., setpoints) of the same. The sensor can be any suitable sensor or set of sensors capable of measuring various system conditions, including, for example, temperature, humidity, pressure, and/or any other suitable parameters to assist in operation and control of the liquid desiccant system. In some implementations the sensor (or at least one sensor from a set of sensors) can be disposed downstream of the absorber. In such implementations, the sensor disposed downstream of the absorber can be configured to measure one or more characteristics of a supply stream (e.g., similar to the supply stream 110) produced by the liquid desiccant system. For example, the sensor can be configured to measure an air supply temperature, and/or an air supply humidity. The sensor, can be coupled to the control unit such that the control unit can receive a signal (e.g., one or more signals) indicative of the measured air supply temperature and/or air supply humidity (e.g., report the measured temperature and humidity to the control unit). In some embodiments, the sensors can measure the air supply temperature, and send signals to the control unit indicative and/or associated with the temperature measured in degrees Celsius and/or in degrees Fahrenheit.

At step 602, the method includes determining, with the control unit, a humidity difference between the measured air supply humidity and a target air supply humidity. In some embodiments, the control unit can receive the measured air supply humidity and compare it to a target air supply humidity (e.g., a desired humidity) selected, for example, by a user of the liquid desiccant system. The target air supply humidity can be stored in a memory of the control unit. The control unit can determine a difference (e.g. a humidity difference) between the measured air supply humidity and the target air supply humidity. In some embodiments the humidity difference determined by the control unit can be used to adjust the operation of one or more components the liquid desiccant system, as further described herein.

At step 603, the method includes determining, with the control unit, a temperature difference between the measured air supply temperature and a target air supply temperature. In some embodiments, the control unit can receive the measured air supply temperature and compare it to a target air supply temperature (e.g., a desired temperature) selected, for example, by a user of the liquid desiccant system. The target air supply temperature can be stored in a memory of the control unit. In some implementations, the target air supply temperature can be a desired air supply dew point (e.g., a target dew point). In some embodiments, the target air supply temperature can be a desired dry bulb temperature (e.g., a target dry bulb temperature). The control unit can determine a difference (e.g. a temperature difference) between the measured air supply temperature and the target air supply temperature. In some embodiments the temperature difference determined by the control unit can be used to adjust the operation of one or more components the liquid desiccant system, as further described herein.

At step 604, the method includes adjusting relatively quickly, via the control unit and based on the humidity difference, an enthalpy change of the supply air in the cooling coil. This corresponds, for example, to the change shown in FIG. 2B indicated by the arrow from point 211 to 211' and results in the supply air quickly reaching the target outlet humidity provided such as displayed as point 212', namely the target dew point of 40° F., in this example.

At step 605, the method includes adjusting, relatively slowly, via the control unit and based on the dry bulb temperature difference, at least one of an amount of heat or a quality of the heat entering the desorber. This corresponds, for example, to the change shown in FIG. 2C indicated by the arrow from point 214 to 214' and results in the supply air relatively slowly reaching the target outlet temperature provided such as displayed as point 212", namely the about 73° F., in this example.

At step 606, the method includes further adjusting, relatively slowly, via the control unit and based on the humidity difference, an enthalpy change of the supply air in the cooling unit. This corresponds, for example, to the change shown in FIG. 2C indicated by the arrow from point 211' to 211" and results in the supply air humidity maintaining the target dew point of about 40° F. as shown by the points 212' and 212" and all points in between as the system relatively slowly reaching the target outlet dew point and temperature provided such as displayed as point 212", namely the target dew point of about 40° F. and the target dry bulb temperature of about 73° F., in this example.

FIG. 7 shows a method 700 of operating a liquid desiccant system to produce an air supply stream, e.g., as shown in and described with respect to FIG. 3. Steps 701, 702, and 703 in method 700 are identical to steps 601, 602, and 603 in method 600.

At step 704, the method includes adjusting relatively quickly, via the control unit and based on the dry bulb temperature difference, an enthalpy change of the supply air in the cooling coil. This corresponds, for example, to the change shown in FIG. 3B indicated by the arrow from point 311 to 311' and results in the supply air quickly reaching the target outlet dry bulb temperature provided such as displayed as point 312', namely the about 73° F. in this example.

At step 705, the method includes adjusting, relatively slowly, via the control unit and based on the humidity difference, at least one of an amount of heat or a quality of the heat entering the desorber. This corresponds, for example, to the change shown in FIG. 3B indicated by the arrow from point 314 to 314' and results in the supply air relatively slowly reaching the target outlet dew point provided such as displayed as point 312", namely the target dew point of 40° F., in this example.

At step 706, the method includes further adjusting, relatively slowly, via the control unit and based on the humidity difference, an enthalpy change of the supply air in the cooling unit. This corresponds, for example, to the change shown in FIG. 3B indicated by the arrow from point 311' to 311" and results in the supply air dry bulb maintaining the target dew point of about 40° F. as shown by the points 312' and 312" and all points in between as the system relatively slowly reaching the target outlet temperature and dew point provided such as displayed as point 312", namely the about 73° F. dry bulb temperature and the target dew point of 40° F., in this example.

While various embodiments have been described above, it should be understood that they have been presented by way of example only, and not limitation. While the embodiments have been particularly shown and described, it will be understood that various changes in form and details may be made. Where schematics and/or embodiments described above indicate certain components arranged in certain orientations or positions, the arrangement of components may be modified. Although various embodiments have been described as having particular features and/or combinations of components, other embodiments are possible having a combination of any features and/or components from any of embodiments as discussed above As used in this specification and/or any claims included herein, the singular forms "a," "an," and "the" include plural referents unless the context clearly dictates otherwise. Thus, for example, the term "a member" is intended to mean a single member or a combination of members, "a material" is intended to mean one or more materials, and/or the like.

As used herein, the phrase "and/or" should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" phrase, whether related or unrelated to those elements specifically identified. Thus, as a non-limiting example, a reference to "A and/or B", when used in conjunction with open-ended language such as "comprising" or "including" can refer, in one embodiment, to A only (optionally including elements other than B); in another embodiment, to B only (optionally including elements other than A); in yet another embodiment, to both A and B (optionally including other elements); etc.

As used herein, the term, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein, the terms "about," "approximately," and/or "substantially" when used in connection with stated value(s) and/or geometric structure(s) or relationship(s) is intended to convey that the value or characteristic so defined is nominally the value stated or characteristic described. In some instances, the terms "about," "approximately," and/or "substantially" can generally mean and/or can generally contemplate a value or characteristic stated within a desirable tolerance (e.g., plus or minus 10% of the value or characteristic stated). For example, a value of about 0.01 can include 0.009 and 0.011, a value of about 0.5 can include 0.45 and 0.55, a value of 7 about 10 can include 9 to 11, and a value of about 1000 can include 900 to 1100. Similarly, a first surface may be described as being substantially parallel to a second surface when the surfaces are nominally parallel. While a value, structure, and/or relationship stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations.

As used herein the term "humidity" when used to describe the condition of air or an air stream can refer to any conventional description of the moisture content of that air included but not limited to the relative humidity, the humidity ratio expressed as a ratio, the humidity ratio expressed as grains per pound, or the dew point.

The invention claimed is:

1. A system, comprising:
    a cooling unit configured to receive an inlet air stream and remove at least one of heat or moisture from the inlet air stream to produce a cooled air stream at a cooling temperature;
    an absorber fluidically coupled to the cooling unit, the absorber defining a liquid/air interface configured to expose the cooled air stream to a liquid desiccant such that the liquid desiccant removes moisture from the cooled air stream at an absorber moisture removal rate and produces a supply air stream at a supply temperature and supply humidity;
    a regenerator coupled to the absorber and the cooling unit, the regenerator including a desorber configured to receive the liquid desiccant after the liquid desiccant is exposed to the cooled air stream, remove moisture from the liquid desiccant at a desorber moisture rejection rate, and then direct the liquid desiccant back to the absorber; and
    a control unit operably coupled to the cooling unit, the absorber, and the regenerator, the control unit configured to adjust at least one of the cooling temperature, the absorber moisture removal rate, or the desorber moisture rejection rate, to produce the supply air stream at a target temperature and a target humidity.

2. The system of claim 1 wherein the regenerator further includes a heating unit disposed upstream from the desorber, the heating unit configured to:
- transfer heat to a regeneration stream to produce a pre-heated stream; and
- expose, at the desorber, the pre-heated stream to the liquid desiccant to remove the moisture from the liquid desiccant at the desorber moisture rejection rate.

3. The system of claim 2, wherein the system further comprises a heat pump, the heating unit includes:
- a fan;
- a heating coil, the heating being a condenser of the heat pump; and
- a sensor configured to measure a temperature of the pre-heated stream, and the control unit is further configured to:
  - receive from the sensor, a signal indicative of the measured temperature of the pre-heated stream; and
  - adjust, based on the signal, at least one of the cooling temperature, the absorber moisture removal rate, or the desorber moisture rejection rate.

4. The system of claim 3, wherein the sensor is a first sensor, the signal is a first signal, and the cooling unit includes:
- a fan;
- a cooling coil, the cooling being an evaporator of the heat pump; and
- a second sensor configured to measure at least one of the cooling temperature or a humidity of the cooled air stream;
- wherein the control unit is further configured to:
  - receive, from the second sensor, a second signal indicative of the measured at least one of the cooling temperature or a humidity of the cooled air stream; and
  - adjust, based on the second signal, at least one of the cooling temperature, the absorber moisture removal rate, or the desorber moisture rejection rate.

5. The system of claim 4, wherein the heat pump is configured to transfer heat from the evaporator to the condenser thereby cooling the evaporator and heating the condenser.

6. The system of claim 5, wherein the heat pump is configured to operate at a variable flow to change an amount of heat transported between the evaporator and condenser.

7. The system of claim 5, further comprising an auxiliary condensing coil configured to receive an external air stream to remove unneeded heat from the heating unit.

8. The system of claim 1, wherein the control unit is configured to adjust one or more parameters of the cooling unit, the absorber and the desorber, to relatively independently control both the supply air dry bulb temperature and dew point.

9. The system of claim 8, wherein the control unit is configured to adjust one or more parameters of the cooling unit, the absorber and the desorber, to operate in a mode that prioritizes a supply air dew point.

10. The system of claim 8, wherein the control unit is configured to adjust one or more parameters of the cooling unit, the absorber and the desorber, to operate in a mode that prioritizes a supply dry bulb temperature.

11. A method, comprising:
- receiving, at a cooling unit, an inlet air stream;
- reducing, via a cooling coil of the cooling unit, enthalpy of the inlet air stream to produce a cooled air stream at a cooling temperature and humidity;
- directing the cooled air stream to an absorber that is fluidically coupled to the cooling unit;
- exposing, at a liquid/air interface of the absorber, the cooled air stream to a liquid desiccant such that the liquid desiccant removes moisture from the cooled air stream at an absorber moisture removal rate and produces a supply air stream at a target supply temperature and humidity;
- directing the liquid desiccant after the liquid desiccant is exposed to the cooled air stream in the absorber to a regenerator, the regenerator including a desorber;
- removing, at the desorber, moisture from the liquid desiccant at a desorber moisture rejection rate;
- directing, after removing the moisture at the desorber, the liquid desiccant back to the absorber; and
- adjusting, with a control unit operably coupled to the cooling unit, the absorber, and the regenerator, at least one of a change in the enthalpy of the inlet air stream by the cooling coil, the absorber moisture removal rate, or the desorber moisture rejection rate, to produce the supply air stream at the target supply temperature and/or humidity.

12. The method of claim 11, wherein:
- receiving, at the control unit, a signal from a sensor, the signal indicative of an air supply temperature and an air supply humidity measured by the sensor;
- determining, with the control unit, a temperature difference between the measured air supply temperature and a target air supply temperature;
- determining, with the control unit, a humidity difference between the measured air supply humidity and a target air supply humidity; and
- adjusting, via the control unit and based on at least one of the temperature difference or the humidity difference (1) at least one of an amount of heat or a quality of the heat entering the desorber to change the desorber moisture removal rate, or (2) an enthalpy change performed by the cooling unit, to produce the supply air stream at the target air supply temperature and the target air supply humidity.

13. The method of claim 12, wherein, to give priority to maintaining the target supply air humidity or in response to a change to the target supply air humidity:
- adjusting, relatively quickly, via the control unit and based on the humidity difference, an enthalpy change of the supply air in the cooling unit to produce the air supply at the target supply humidity; and
- adjusting, relatively slowly, via the control unit and based on the temperature difference, at least one of an amount of heat or a quality of the heat entering the desorber.

14. The method of claim 13, wherein the supply air humidity is kept within 1.0 degree of a target supply air dew point.

15. The method of claim 14, wherein the supply air dry bulb temperature is kept within 1 degree of a target supply air dry bulb temperature.

16. The method of claim 12, wherein, to give priority to maintaining the target supply air temperature or in response to a change to the target supply air temperature:
- adjusting, relatively quickly, via the control unit and based on the temperature difference, an enthalpy change of the supply air in the cooling unit to produce the air supply at the target supply air humidity; and
- adjusting, relatively slowly, via the control unit and based on the humidity difference, at least one of an amount of heat or a quality of the heat entering the desorber.

17. The method of claim 16, wherein the supply air dry bulb temperature is kept within 1.0 degree of a target supply air dry bulb temperature.

18. The method of claim 17, wherein the supply air humidity is kept within 1.0 degree of a target supply air dew point.

19. The method of claim 12, wherein the enthalpy change performed by the cooling unit results in the cooled air stream that is below a dew point temperature of the inlet air stream, and the cooling unit removes moisture at a condensate moisture removal rate.

20. The method of claim 19, wherein the enthalpy change performed by the cooling unit is changed by changing a mass flowrate of a refrigerant of a cooling coil of the cooling unit.

21. The method of claim 12, wherein removing moisture from the liquid desiccant at the desorber includes:
   flowing a regeneration stream through a heating unit included in the regenerator, the heating unit coupled to the desorber, the heating unit including a fan and a heating coil to produce a pre-heated air stream; and
   exposing, at a liquid/air interface of the desorber, the pre-heated air stream to the liquid desiccant to remove the moisture from the liquid desiccant at the desorber moisture rejection rate.

22. The method of claim 21, wherein the heat transferred to the regeneration stream at the heating unit, and thus the moisture removal rate of the desorber, is adjusted by changing a target temperature of the pre-heated air stream.

23. The method of claim 22, wherein the heating unit is operably coupled to the cooling coil by a heat pump and transports heat from the cooling coil to the heating coil.

24. The method of claim 23, wherein a temperature of the pre-heated air is adjusted via an auxiliary condensing coil, the auxiliary condensing coil configured to flow an external air stream through the heating unit to remove a portion of the heat transferred from the cooling unit.

25. The method of claim 24, wherein the portion of the heat removed by the external air stream is adjusted by varying a speed of a fan drawing the external air stream through the auxiliary condensing coil.

26. The method of claim 24, wherein the portion of the heat removed by the external air stream is adjusted by varying an amount of heat transferred to the auxiliary condensing coil.

27. The method of claim 26, wherein the amount of heat transferred to the auxiliary condensing coil is adjusted by changing an amount of refrigerant flowing through the auxiliary condensing coil and the temperature of the pre-heated air stream is changed by changing a volume of air passing through the heating coil.

28. The method of claim 26, wherein the amount of heat transferred to the auxiliary condensing coil is changed by changing the volume of air passing through the heating coil which in turn is controlled by changing the pressure drop of the air directed towards the heating coil.

29. The method of claim 12, wherein the adjusting includes adjusting, via the control unit and based on at least one of the temperature difference or the humidity difference (1) at least one of the amount of heat or the quality of the heat entering the desorber to change the desorber moisture removal rate, and (2) the enthalpy change performed by the cooling unit, to produce the supply air stream at the target air supply temperature and the target air supply humidity.

30. The method of claim 29, wherein the adjusting includes adjusting, via the control unit and based on the temperature difference and the humidity difference (1) the amount of heat and the quality of the heat entering the desorber to change the desorber moisture removal rate, and (2) the enthalpy change performed by the cooling unit, to produce the supply air stream at the target air supply temperature and the target air supply humidity.

* * * * *